(12) United States Patent
Mimassi

(10) Patent No.: US 11,580,485 B2
(45) Date of Patent: *Feb. 14, 2023

(54) EN-ROUTE BUSINESS SELECTION AND ORDERING WITH OPTIMIZED PACKAGING FOR FOOD DELIVERY AND TAKE-OUT

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,525

(22) Filed: Jul. 18, 2022

(65) Prior Publication Data
US 2022/0358454 A1  Nov. 10, 2022

Related U.S. Application Data

(63) Continuation-in-part of application No. 17/148,313, filed on Jan. 13, 2021, now Pat. No. 11,403,587, which is a continuation-in-part of application No. 16/898,839, filed on Jun. 11, 2020, now Pat. No. 10,977,606, which is a continuation-in-part of application No. 16/796,505, filed on Feb. 20, 2020, now abandoned.

(60) Provisional application No. 63/119,724, filed on Dec. 1, 2020, provisional application No. 62/938,822, filed on Nov. 21, 2019, provisional application No. 62/938,835, filed on Nov. 21, 2019.

(51) Int. Cl.
| | | |
|---|---|---|
| *G06Q 10/08* | (2012.01) | |
| *G06Q 50/30* | (2012.01) | |
| *G06Q 10/0832* | (2023.01) | |

(52) U.S. Cl.
CPC ......... *G06Q 10/0832* (2013.01); *G06Q 50/30* (2013.01)

(58) Field of Classification Search
CPC ......... G06Q 10/0832; G06Q 10/08355; G06Q 10/08; G06Q 10/083; G06Q 30/0282; G06Q 30/0631; G06Q 50/30; G06K 19/00; G06K 19/04; G06K 19/06
USPC .................. 705/347, 338; 235/487, 375, 381
See application file for complete search history.

(56) References Cited

U.S. PATENT DOCUMENTS

| | | | |
|---|---|---|---|
| 11,210,721 B1 * | 12/2021 | Feng .................. | G06Q 30/0631 |
| 2015/0186966 A1 | 7/2015 | Holman et al. | |
| 2015/0227890 A1 * | 8/2015 | Bednarek .......... | G06Q 10/0833 705/26.81 |
| 2020/0410417 A1 * | 12/2020 | Sion ....................... | G06Q 10/04 |

(Continued)

*Primary Examiner* — Edwyn Labaze
(74) *Attorney, Agent, or Firm* — Galvin Patent Law LLC; Brian R. Galvin

(57) ABSTRACT

A system and method for en-route business selection and ordering with optimized packaging for food delivery and takeout. The system is a cloud-based network containing an optimization server, portals for restaurants, customers, and drivers to enter their information, a rules library, a label manager, and a food packaging optimization module which determines optimal packaging groupings and configurations based on a multitude of variables associated with the restaurant, customer preferences, and the available menu. The system may be accessed through web browsers or purpose-built computer and mobile phone applications.

10 Claims, 18 Drawing Sheets

(56) References Cited

U.S. PATENT DOCUMENTS

2021/0216959 A1 7/2021 Hapgood et al.
2021/0248530 A1* 8/2021 Garcia-Brosa ... G06Q 10/06312

* cited by examiner

| | | |
|---|---|---|
| 501 | Customer Name: | Jane Doe |
| 501 | Customer Address: | 1234 N. Gumwood St. Coolsville, WA 56789 |
| 501 | Customer Phone #: | (111) 555-5555 |
| 502 | Menu Item: | Spaghetti w/ Meatball and Garlic Bread |
| 503 | Contents: | Spaghetti Pasta |
| 504 | Servings: | 2 |
| 505 | Container #: | 2 of 3 |
| 506 | Reheating Instructions: | Preheat oven to 350 F. Place the pasta in an oven-safe shallow bowl with about a cup of the spaghetti sauce (found in separate container) and cover tightly with aluminum foil. Heat pasta about 20 minutes. Combine with rest of sauce and meatballs, enjoy! |

507 — QR code

EN-ROUTE BUSINESS SELECTION AND ORDERING WITH OPTIMIZED PACKAGING FOR FOOD DELIVERY AND TAKE-OUT

CROSS-REFERENCE TO RELATED APPLICATIONS

Priority is claimed in the application data sheet to the following patents or patent applications, the entire written description of each of which is expressly incorporated herein by reference in its entirety:
17/148,313
63/119,724
16/898,839
62/938,835
16/796,505
62/938,822

BACKGROUND

Field of the Art

The disclosure relates to the field of restaurant management, and more particularly to the field of food packaging for delivery or take-out service.

Discussion of the State of the Art

Travelers frequently wish to stop by a retail business establishment on the way to their destinations. As a very common example, drivers frequently wish to stop for food on the way to their destination, often preferring to order food for take-out that can be consumed at the destination. However, while mobile phones and navigation systems do allow for searching of nearby restaurants the process requires substantial concentration, either requiring a passenger to do the work and coordinate with the driver or requiring the driver to park in order to conduct the searching. The process is cumbersome, and can take a considerable amount of time to complete, matching restaurant names or types to food preferences, or browsing through menus on the driver's mobile device. When performed by the driver while parked, the driver wastes driving time to the destination. Further, there is currently no available system that automatically optimizes the process to account for a variety of customer preferences, including minimizing the delay caused by the re-routing to pick up food, or that coordinates the customer's arrival time at the restaurant with the food preparation time, such that the customer's order is ready when the customer arrives.

With respect to deliveries, there is currently no system that coordinates and optimizes order pickup times, delivery destinations, and driver routing to maximize efficiency, whether for a single business establishment or multiple business establishments that wish to share delivery drivers.

Furthermore, due to the time and distance involved with food delivery and take-out actions, when food arrives at its destination there can often be a significant difference from the way the food would have been presented and experienced in a typical sit-down restaurant. When a food order arrives at its final destination it may be in such a state that may make the food less enjoyable to eat, either due to the taste, quality, or expectation of experience, among many other possible factors.

What is needed is a system and method for en-route selection of a business venue and ordering, with optimized packaging for food delivery and take-out which enables the customer to experience the food as if it were a dine-in setting and with minimal delay to their planned route.

SUMMARY

Accordingly, the inventor has conceived and reduced to practice, a system and method for en-route business selection and ordering with optimized packaging for food delivery and takeout. The system is a cloud-based network containing an optimization server, portals for restaurants, customers, and drivers to enter their information, a rules library, a label manager, and a food packaging optimization module which determines optimal packaging groupings and configurations based on a multitude of variables associated with the restaurant, customer preferences, and the available menu. The system may be accessed through web browsers or purpose-built computer and mobile phone applications.

According to a preferred embodiment, a system for system for en-route business selection and ordering with optimized packaging for food delivery and takeout, comprising: a rules library database comprising a plurality of group identifiers, and for each group identifier one or more properties that define each specific group identifier; a container database comprising container inventory information, the container inventory information comprising a plurality of types of containers, and for each type of container a quantity and brief description of container features; a restaurant database comprising all available menu offerings, and for each menu offering a food that comprises the menu offering; a business selection engine comprising a first plurality of programming instructions stored in a memory of, and operable on a processor of, a network-connected computing device, wherein the first plurality of programming instructions, when operating on the processor, cause the computing device to: receive an order request from a user device via a network, the order request comprising a plurality of requested menu items desired by a user and a current destination of the user; receive a current location from the user device; search the restaurant database to identify suitable venues based on at least one of the requested menu items; select a plurality of the suitable venues based on at least the current location; determine a best-fit path between the current location and one of the selected venues, the best-fit path being based on the order request; send the best-fit path to the user device; send the order request to a food packaging optimization module; the food packaging optimization module comprising a second plurality of programming instructions stored in a memory of, and operable on a processor of, a computing device, wherein the second plurality of programming instructions, when operating on the processor, cause the computing device to: receive the order request; retrieve a plurality of food components from the business database, the food items being associated with each of the plurality of menu items in the order request; assign at least one group identifier for each food component; retrieve a plurality of properties for each assigned group identifier from the rules library database; create a data graph from the food components, the group identifiers, and the properties, the data graph comprising vertices and edges, wherein the vertices represent data points and the edges the relationships between data points; analyze the data graph to create packaging groups for each order comprising a plurality of foods and their specific group identifiers; and send a packaging plan comprising the packaging groups for each order to a packaging coordinator, the packaging groups being created such that the packaged foods for each order arrive in an optimal state for consumption; a packaging coordinator comprising a second plurality of programming instructions stored in a memory of, and operable on a processor of, a network connected computing device, wherein the second plurality of programming instructions, when operating on the processor, cause the computing device to: receive the packaging plan; receive food schedule information, the food schedule information comprising a food preparation start time and estimated time to completion; retrieve container inventory information from a container database; select a packaging container for each packaging group contained in the packaging plan by comparing the description of container features with the foods and their group identifiers; add the selected packaging containers to the packaging plan; and send the packaging plan and a packaging start time to a restaurant computing device, the packaging time being calculated such that the packaging is ready as each food is finished cooking, is disclosed.

According to another preferred embodiment, a method for en-route business selection and ordering with optimized packaging for food delivery and takeout, comprising the steps of: receiving, at a business selection engine, an order request from a user device via a network, the order request comprising a plurality of requested menu items desired by a user and a current destination of the user; receiving a current location from the user device; searching the restaurant database to identify suitable venues based on at least one of the requested menu items; selecting a plurality of the suitable venues based on at least the current location; determining a best-fit path between the current location and one of the selected venues, the best-fit path being based on the order request; sending the best-fit path to the user device; send the order request to a food packaging optimization module; retrieving, at the food packaging optimization module, a plurality of food components from the business database, the food items being associated with each of the plurality of menu items in the order request; assigning at least one group identifier for each food component; retrieving a plurality of properties for each assigned group identifier from the rules library database; creating a data graph from the food components, the group identifiers, and the properties, the data graph comprising vertices and edges, wherein the vertices represent data points and the edges the relationships between data points; analyzing the data graph to create packaging groups for each order comprising a plurality of foods and their specific group identifiers; and sending a packaging plan comprising the packaging groups for each order to a restaurant computing device, the packaging groups being created such that the packaged foods for each order arrive in an optimal state for consumption; receiving, at the packaging coordinator, food schedule information, the food schedule information comprising a food preparation start time and estimated time to completion; retrieving container inventory information from a container database; selecting a packaging container for each packaging group contained in the packaging plan by comparing the description of container features with the foods and their group identifiers; adding the selected packaging containers to the packaging plan; and sending the packaging plan and a packaging start time to a restaurant computing device, the packaging time being calculated such that the packaging is ready as each food is finished cooking, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 5 is a diagram illustrating an exemplary packaging tag produced by a system for optimally packaging food for delivery and take-out, according to an embodiment.

DETAILED DESCRIPTION

Figure 1:
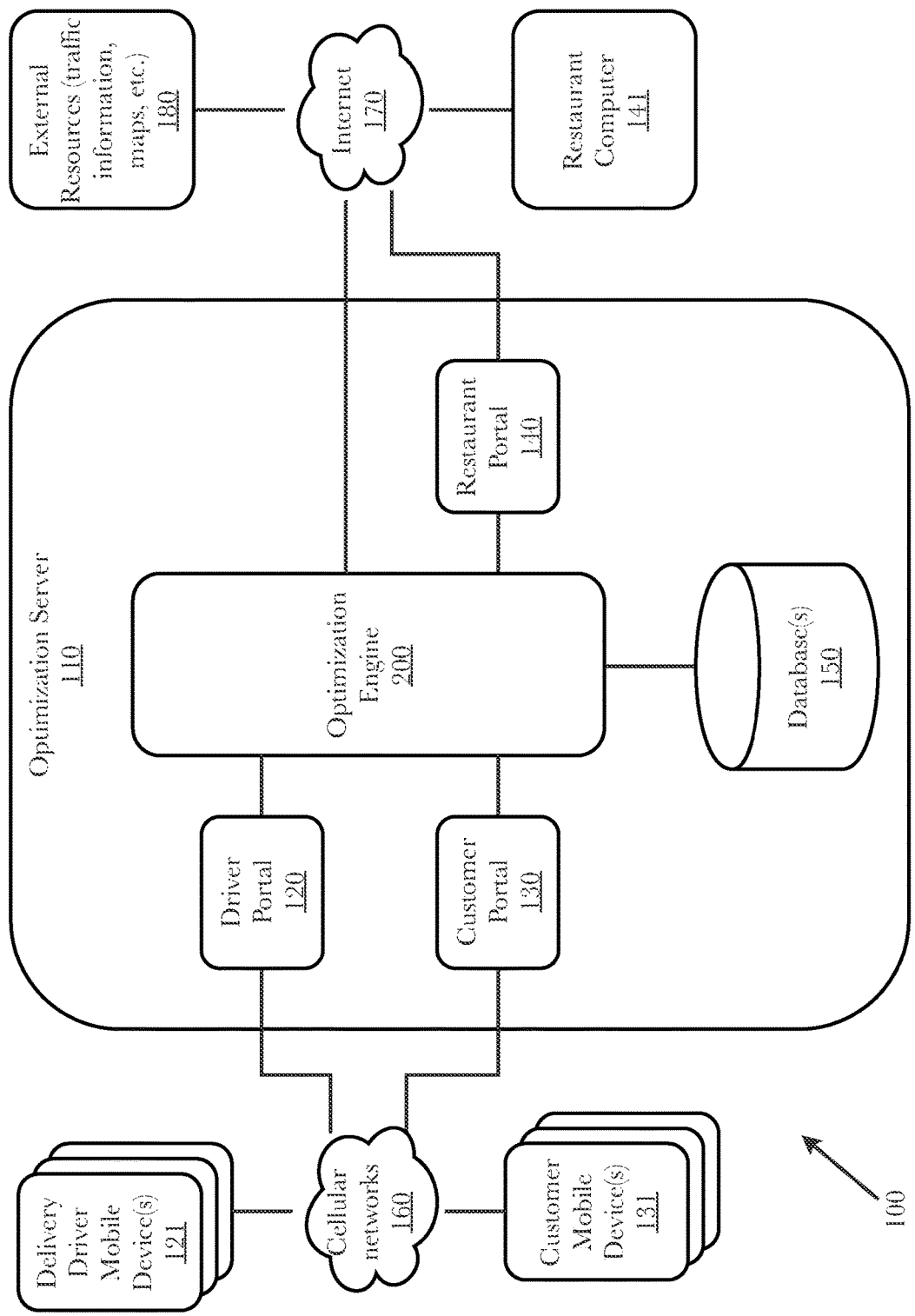
FIG. 1 is a block diagram illustrating an exemplary system architecture for an automated en-route business establishment selection, ordering, and routing system.

The inventor has conceived, and reduced to practice, a system and method for en-route business selection and ordering with optimized packaging for food delivery and takeout. The system is a cloud-based network containing an optimization server, portals for restaurants, customers, and drivers to enter their information, a rules library, a label manager, and a food packaging optimization module which determines optimal packaging groupings and configurations based on a multitude of variables associated with the restaurant, customer preferences, and the available menu. The system may be accessed through web browsers or purpose-built computer and mobile phone applications.

At a typical dine-in experience, the customer at a restaurant may place an order with special requests such as a substitution (e.g., side salad in place of French fries, etc.) or a withholding of an ingredient or meal component (e.g., allergy concerns, no salt added, reduced spice level, etc.). In a dine-in setting the food is usually served on plates. This allows waiters to view the contents of the plate and visually verify that the food is served according to the customer's preferences. However, when a food order is for delivery or take-out it can be difficult to discern what food items are inside a to-go container. Opening the container to view the contents may lower the temperature of the food inside which can lead to the food order arriving in a suboptimal state for consumption.

The present disclosed system may provide a packaging plan the can be used to by restaurant staff when packaging food orders for delivery or take-out. In an embodiment, the system creates a list of the food components that are contained in a received food order, categorizes the components on the list by assigning group identifiers to each component, and then creates optimal packaging groups for the food components. The packaging groups may be determined using a rules library that stores the properties of each group identifier, and, using the properties, analyzes the relationships between the food components and creates packaging groups based upon the analysis. The system may further generate packaging tags that may be placed upon the containers which relay information about the contents of the container, which may be used to verify the contents without having to open the container.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a delivery-based business. Many examples herein use a restaurant as the business establishment, but the invention is not limited to use in restaurants, and is applicable to any business establishment.

"Menu offering" or "menu item" as used herein refer to any prepared food and beverages that may be purchased from a restaurant. Typical menu offerings may include, but is not limited to: breakfast, lunch, and dinner entrees, a la carte items, appetizers, side dishes, beverages, and desserts.

"Food component" or "dish component" as used herein refer to the food items that are assembled to construct a menu item. This term should not be confused with the ingredients used to prepare a menu item, as food components are a step above ingredients. For example, a menu item may be spaghetti Bolognese with garlic bread, and the components this menu item is comprised of may be spaghetti pasta, Bolognese sauce, and garlic bread. Each of these components is created using various ingredients, for instance, the garlic bread is made using the ingredients French bread, butter, garlic, salt, pepper, and onion powder. The kitchen staff prepare each food component using a recipe of ingredients, and then assemble all necessary food components to create a menu item.

Conceptual Architecture

FIG. 1 is a block diagram illustrating an exemplary system architecture 100 for an automated en-route business establishment selection, ordering, and routing system. In this embodiment which uses a restaurant as the business establishment, the system comprises an optimization server 110, a driver portal 120, a customer portal, a restaurant portal, a database, and an optimization engine. Delivery driver mobile devices 121 may connect to the driver portal 120, typically via a cellular phone network 160, although connections may be made through other means, as well, such as through the Internet 170 (e.g., through a WiFi router). Customer mobile devices 131 may likewise connect to the customer portal 130 via a cellular phone network 160, the Internet 170, or other network connection. Restaurant computers 141 (which do not necessarily need to be mobile, as they are located as the restaurant location) may connect to the restaurant portal 140, typically through an Internet 170 connection, although other network connections may be used.

In the use case of a customer en-route to a destination, customers will connect to the customer portal 130 to pre-enter a variety of preferences and other information that will be stored in a database 150, and used by the optimization engine 200 to suggest restaurants, menu items, and routing options that meet the customer's preferences. Examples of the types of preferences that a customer may enter include, but are not limited to: food preferences such as types of food, food allergies or sensitivities, reheating tools (e.g., convection oven, microwave oven, etc.), frequency with which preferred foods are eaten, ranking of particular foods relative to other foods, customer inconvenience preferences such as time delays and routing distances, time after pickup before eating (to ensure that food is still hot when arriving at the customer's destination), food attributes such as price, calories, ingredients, and side dishes. In some embodiments, certain of these preferences will be determined by the system. For example, the types of food preferred by the customer and the frequency with which preferred foods are eaten may be determined based on the customer's history of usage as stored in a database 150 in the system. Other such preferences and factors may also be determined by the system.

Likewise, restaurants may connect to the restaurant portal 140 to enter information about the restaurant and its menu. Examples of the types of information that a restaurant may enter include, but are not limited to: restaurant name, location, types of food offered, hours of operation, phone number, all menu offerings, the food components that make up each menu offering (e.g., spaghetti with meat balls is menu offering and its food components are pasta, sauce, meatballs, and garlic bread), and reheating instructions for each food component, food preparation times for certain dishes (including adjustments to food preparation times during busy periods for the restaurant), to-go container inventory, prices, calorie counts, ingredients, side dishes, drinks, and special pricing options like daily "happy hour" specials or seasonal offerings. In some embodiments, the system may be able to determine certain restaurant information by accessing external resources 180 such as mapping websites and applications, or recipe websites for reheating instructions. For example, the system may access a publicly-available mapping website such as Google maps, which may contain information about the restaurant's name, location, types of food offered, hours of operation, phone number, etc. Thus, in some embodiments, it is not necessary for the restaurant to enter certain information through the portal, as the information may be automatically obtained from external resources 180.

When a customer mobile device 131 connects to the optimization server 110 and the customer requests en-route restaurant selection assistance, the optimization engine 200 retrieves the customer's preferences from a database 150. The customer may further enter a destination or select a pre-entered destination presented from the customer's preferences, which will allow the system to better customize its suggestions. The optimization engine 200 then determines the customer's location by querying the customer's mobile device for location information (e.g., provided by the mobile device's GPS hardware, WiFi location applications, etc.) and gathers information from external resources 180 about restaurant options located nearby and along the route from the customer's currently location to the customer's destination, as well as traffic information related to the customer's location, intended route, and identified restaurant options. The optimization engine 200 retrieves additional information from a database about identified restaurant options, if such information is available. Based on the customer preferences, restaurant information, and traffic information, the optimization engine 200 identifies one or more restaurants and one or more food options available at those restaurants that are compatible with the customer's preferences, and presents the identified restaurants and their corresponding food options to the customer on the customer's mobile device 131 as suggestions along with indications of the additional delay that will be caused by choosing each suggestion. Thus, the driver is freed of the bulk of the distracting work of finding available restaurants, and can simply select an option presented by the optimization engine 200, knowing that the option will be compatible with his or her preferences and that the delay time will be acceptable. In some embodiments, an application on the customer's mobile device 131 may dial the phone number of the chosen restaurant for the customer to place the order. In some embodiments, the optimization server 110 will contact the restaurant through the restaurant portal 140 to automatically enter an order into the restaurant's computer 141, or to direct an employee of the restaurant to call the customer's mobile device 131, or to establish a voice connection between the restaurant and the customer's mobile device 131 through another means (e.g., voice over internet protocol, or VOIP).

In some embodiments, the optimization engine 200, through the restaurant portal 140, may also provide information to the restaurant to schedule the restaurant's food preparation activities to coordinate with the customer's arrival. If the restaurant has entered information such as food preparation times, the optimization engine 200 may use that information to instruct the restaurant's kitchen staff when to start preparation of the customer's order, such that the order will be ready just prior to arrival of the customer. Such food preparation times and scheduling may be adjusted for busy periods at the restaurant (typically around lunch and dinner) either automatically based on the restaurant's history as stored in a database 150, or by retrieving information stored in a database 150 that has been manually entered by the restaurant through the restaurant portal 140.

In the use case of delivery driver routing, drivers will connect to the driver portal 120 to pre-enter a variety of preferences and other information that will be stored in a database 150, and used by the optimization engine 200 to suggest pickup times, routes, and scheduling of deliveries. Delivery drivers may be employed by a single restaurant, employed on a shared basis among multiple restaurants, or may be freelance drivers who make themselves available through the system to any restaurant requiring delivery services. Examples of the types of preferences and information that a delivery driver may enter include, but are not limited to: hours of availability, geographical area served by the driver, type of vehicle, and vehicle capacity. The optimization engine 200 tracks driver location, number of orders in the vehicle currently in delivery, traffic information, order availability and location of participating restaurants, and the preferences and information entered by the driver to optimize pick-ups, deliveries, and routing among one or more delivery drivers. As just one example of optimization, a driver on a scooter may only be able to carry a single order and may be further away from the restaurant than a driver in a car, but because of the scooter's small size and maneuverability the optimization engine may select the scooter over the car to make certain deliveries faster. In some embodiments, certain parameters will be determined by the system. For example, the optimization engine may recognize from historical information in a database of drivers that scooters, on average, save a certain number of minutes in delivery along certain routes, or that a particular driver is faster than others.

Figure 2:
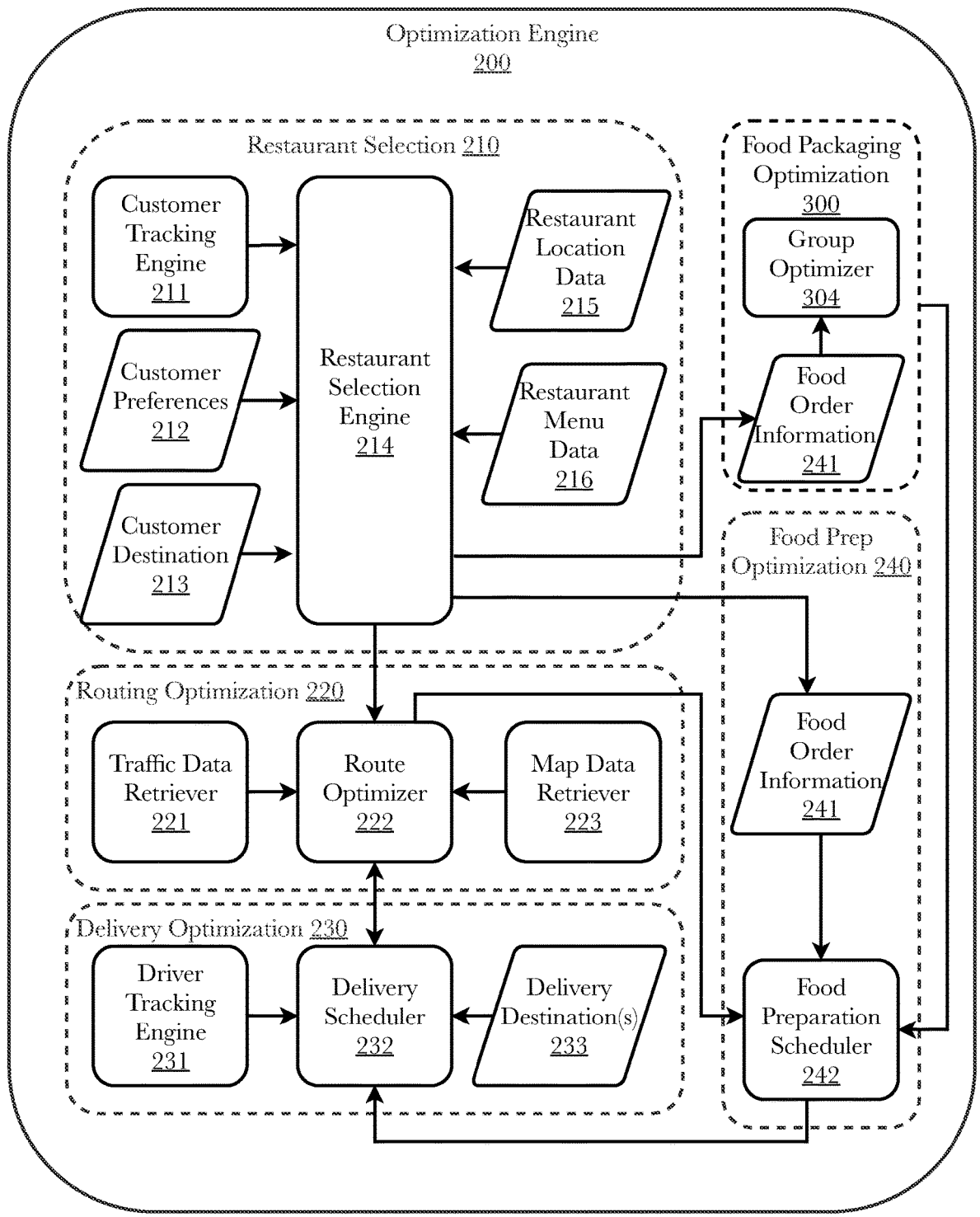
FIG. 2 is a block diagram illustrating an exemplary architecture for an aspect of an automated en-route business establishment selection, ordering, and routing system, the optimization engine.

FIG. 2 is a block diagram illustrating an exemplary architecture for an aspect of an automated en-route business establishment selection, ordering, and routing system, the optimization engine 200. In this embodiment, the optimization engine 200 comprises several subsystems, a restaurant selection subsystem 210, a routing optimization subsystem 220, a delivery optimization subsystem 230, a food preparation optimization subsystem 240, and a food packaging optimization subsystem 300. The restaurant selection subsystem comprises a customer tracking engine 211 and a restaurant selection engine 214. The customer tracking engine 211 keeps track of the customer's current location by querying the customer's mobile device 131 for location information. The customer preferences 212, restaurant location data 215, and restaurant menu data 216 may be retrieved from a database 150 or, in some embodiments, obtained from external resources 180. The customer's destination 213 will typically be indicated by the customer using an application on his or her mobile device 131.

The routing optimization subsystem comprises a route optimizer 222, a traffic data retriever 221, and a map data retriever 223. The traffic data retriever 221 obtains current traffic information from external sources 180, while the map data retriever 223 may either obtain map data from a database 150 or from external resources 180.

The delivery optimization subsystem 230 comprises a driver tracking engine 231, and a delivery scheduler 232, and may receive as input delivery destinations 233. The customer preferences database contains a variety of pre-entered or pre-determined information about the customer's preferences.

The food preparation optimization subsystem 240 comprises a food preparation scheduler 242, which receives as input food order information 241 comprising a customer's order and customer details (e.g., customer name, phone number, address, etc.). A food preparation scheduler 242 may allow for input provided manually or automatically through an Internet-Of-Things ("TOT") piece of cookware, such as a stove or microwave or other appliance, to track the progression of an order, such as cook time or status of the cooking or packaging of an order, or it may estimate based on a pre-determined time estimation for different food items to be prepared.

A food preparation scheduler 242, in concert with a route optimizer 222 and delivery scheduler 232, may provide for automated or manual, or partially-manual, updates on a delivery's status, during the food preparation, the food pickup, and the food delivery, through any combination of IOT food preparation appliances and systems, manual input from cooks and chefs or other restaurant or kitchen staff, pre-stored time estimates for food preparation time, route optimization and scheduling based on traffic data and driver data, and delivery timing based on driver performance, route selection, traffic data, and any manually input data from a driver such as unexpected delays, as necessary.

In operation, when a customer has requested restaurant selection assistance the restaurant selection engine 214 receives the customer's current location from the customer tracking engine 211 and the customer's destination 213. The restaurant selection engine 214 obtains restaurant location data 215 and restaurant menu data 216 for one or more restaurants either from a database 150 or from external resources 180. The restaurant selection engine 214 then uses optimization algorithms to determine which restaurants offer food items compatible with the customer's preferences, and which minimize the inconvenience to the customer of making a detour to the restaurant to pick up the food. The restaurant selection engine 214 presents recommendations to the customer about restaurants and food items meeting the customer's preferences and allows the customer to select an option on his or her mobile device 131 by simply selecting an option (on a touch-based mobile device interface, for example, the customer would simply touch on one of the presented options with his or her finger). The restaurant optimization engine 214 then sends the information about the selected restaurant to a route optimizer 222, which obtains traffic data from the traffic data retriever 221 and map data from the map data retriever 223, and calculates an optimal route. Simultaneously, the restaurant selection engine 214 sends food order information 241 to a group optimizer 304 and food preparation scheduler 242 (which may be running on the optimization server 110 or on the restaurant's computer 141), which calculates a food preparation start time determined by comparing the food's preparation time as retrieved from a database 150 with the customer's expected arrival time as determined by the route optimizer 222.

In some embodiments, the optimization engine may have a delivery optimization subsystem 230, in which a delivery scheduler 232 receives food pickup times from the food preparation scheduler 242, restaurant locations and routing information from the route optimizer 222, delivery destination information 233, and the current location of the driver from the driver tracking engine 231. Based on that information, the delivery scheduler may choose an available driver to deliver the order most efficiently (e.g., shortest time from order readiness to arrival at the delivery destination).

In some embodiments, optimization engine 200 may have a food packaging optimization subsystem 300, in which a group optimizer 304 receives as input food order information 241 from a restaurant selection engine. Food packaging optimization subsystem 300 produces a packaging plan for the received food order. Packaging plans are created so that, when a food delivery or take-out order arrives at its destination, it is in an optimal state for consumption. The group optimizer 304 parses the food order information and uses menu offering data retrieved from a database 150 to create a list of all the food components associated with the menu items specified in the food order information 241. Then, group optimizer 304 may assign one or more group identifiers to each food component on the list and use predefined grouping rules stored in a database 150 to determine optimal packaging groups for food delivery or take-out orders. Food packaging optimizer 300 may communicate with other subsystems existing within optimization engine 200 to coordinate preparation, packaging, and delivery tasks such that food is prepared, packaged, and picked-up for delivery or take-out with a minimal time delay between each task. For more detailed information regarding food packaging optimization subsystem 300 refer to FIG. 3.

Note that this example is simplified for clarity, and that the actual optimization engine 200 will address a much broader set of factors and variables, as described elsewhere herein. The optimization engine may use any number of optimization algorithms, including machine learning algorithms, to find optimal solutions to the large number of variables presented.

Figure 3:
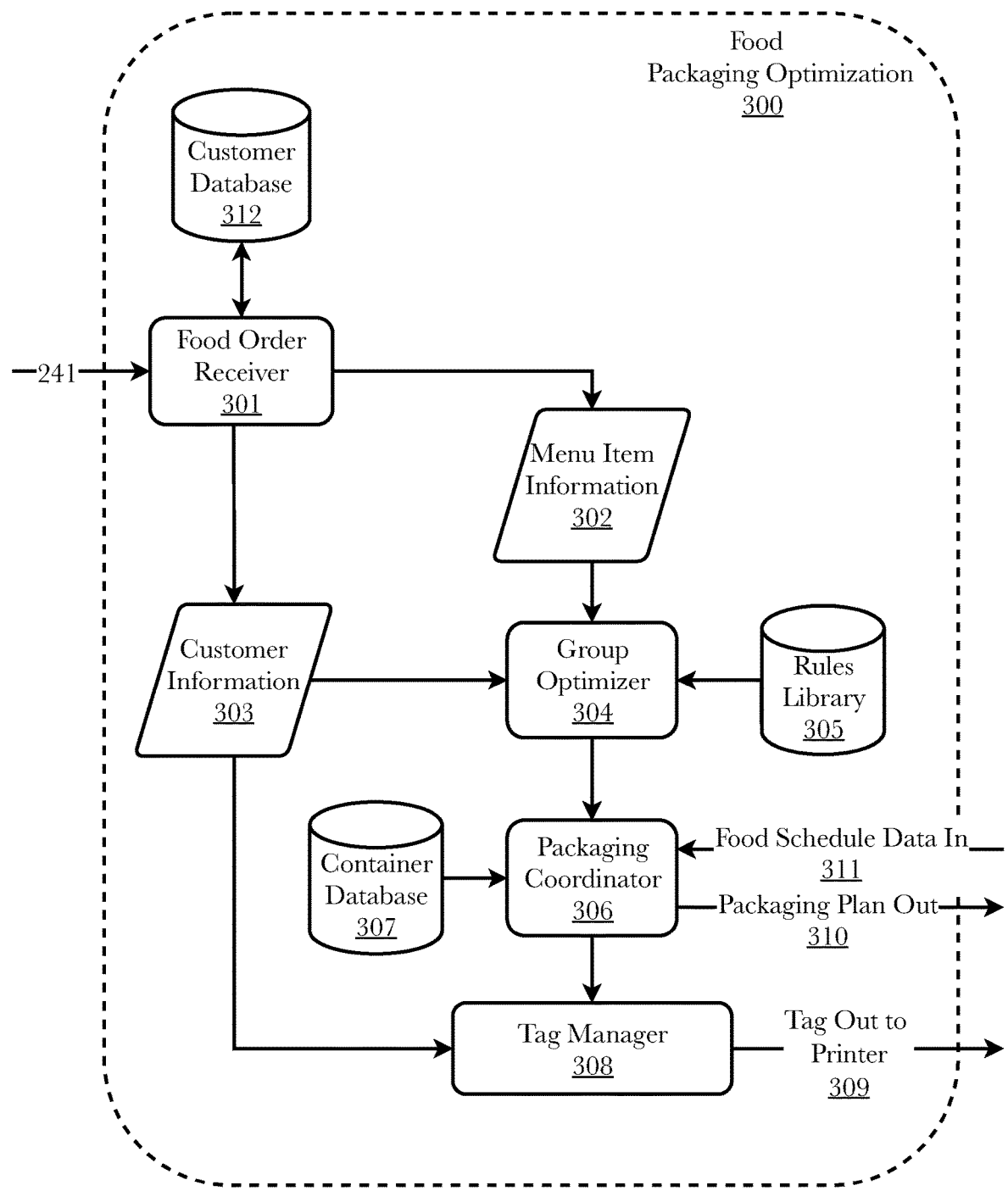
FIG. 3 is a block diagram illustrating an exemplary system architecture for optimized packaging for food delivery and take-out.

FIG. 3 is a block diagram illustrating an exemplary system architecture for optimized packaging for food delivery and take-out 300. In this embodiment, food packaging optimization system 300 comprises a food order receiver 301, a group optimizer 304 which may utilize a rules library 305 that exists within a database 150, a packaging coordinator 306 which receives a packaging plan from the group optimizer 304 and retrieves to-go container inventory data from a container database 307 to suggest container packaging for each packaging group contained within a packaging plan, and a tag manager 308 which produces tags for each packaging group and may alert the other subsystems within optimization engine 200 when a food order has been completely packaged and is ready for pick-up.

When a food order is made to a restaurant, the food order information, comprising a customer's order (comprising one or more ordered menu offerings) and customer information (e.g., customer name, phone number, address, preferences, etc.), may be sent to food packaging optimization system 300 and a food order receiver 301 may parse the food order information and send the ordered menu item information to a group optimizer 304. Customer information may be used to retrieve available customer preferences stored in a customer database 312. Food order receiver 301 sends the parsed customer details to both group optimizer 304 and tag manager 308.

Group optimizer 304 receives menu item information 302, retrieves food component data for each menu item contained within the received food order 241, creates a list of all retrieved food components, and assigns one or more group identifiers to each food component in the list. Group optimizer 304 also receives customer information such as customer preferences which may be used to further assign group identifiers to each food component. For example, a customer may have a preference for non-spicy foods so when the customer makes a food order all components of the customer's ordered menu item may be assigned the non-spicy identifier which signals that these components should not be packaged with any food that has a spicy identifier. Once each food component on the list has been assigned group identifiers, group optimizer 304 queries a rules library 305 to create optimal packaging groups of food components. Rules library 305 contains group identifiers and for each group identifier one or more rules that define the properties of a group identifier and specify the relationships between group identifiers. As a simple example, a group identifier may be "meat" which has a property that require it to stay within a temperature range to keep it hot and safe to consume, and may have a positive allowable relationship with group identifier "hot" and a forbidden relationship with group identifiers "cold" or "frozen". These relationship constraints would prevent group optimizer 304 from placing a food component with a "meat" identifier in the same packaging group as a food component with a "cold" identifier. This helps to ensure that the food order is packaged such that it may arrive to its destination in an optimal state of consumption. Group optimizer 304 may produce a packaging plan consisting of the created packaging groups, and send the packaging plan to a packaging coordinator 306.

A packaging coordinator 306 receives the packaging plan and, using the created packaging groups and a container database 307, may select appropriate containers for each packaging group. Container database 307 contains a restaurant's to-go container inventory data such as the various types of to-go containers available in restaurant and the quantity of each container type, as well as a brief description of the container features. For example, container features may include, but is not limited to the type of food that each container may store, features such as "vented", "thermal", "insulated", etc., and packaging group identifiers that link food components to containers (e.g., a soup container may be linked to a "soup" or "sauce" group identifier). For example, if a packaging group contains a tempura vegetable appetizer, then the packaging coordinator may select a container with that is vented to allow the steam from the heat of the food to escape the container, thus allowing the tempura vegetables to arrive still crispy and not soggy from absorbing the moisture of the steam. Packaging coordinator 306 adds the selected containers to the received packaging plan. The packaging coordinator may also receive food schedule data 311 from a food preparation scheduler 242. Food schedule data 311 may include information such as a food order preparation start time and an estimated time to completion. In an embodiment, group optimizer 304 uses the received food schedule data to choose a packaging start time, selected such that the packaging may be retrieved and set up at a packaging staging station at the restaurant before or after the food components have finished cooking. The packaging plan and the packaging start time may be sent to a restaurant computer or mobile device 310. Group optimizer 304 then forwards that packaging plan to a tag manager 308.

A tag manager 308 receives a packaging plan and customer information 303 and generates a packaging tag for each packaging group to be attached to its selected container. The information included on a packaging tag may include, but is not limited to a customer name, address, and phone number, the contents of the container and which menu item the contents belong to, and reheating instructions for the contents of the container. Additionally, a packaging tag may include a scannable identifier (e.g., bar code, QR code, numeric identifier, etc.) that may be scanned when a food order packaging group has been completely packaged. The packaging tag may consist of various formats. In one embodiment, the packaging tag may list information using words such as, for example, a return address label. In another embodiment, packaging tag may consist of only a QR code with all tag information encoded into the QR code. Other possible tag formats, such as a combination of words and QR code, may be used to create a packaging tag. The created tag may be sent out directly to a printer 309, or a restaurant computer or mobile device where it may be reviewed before being sent to a printer.

For example, food packaging optimization system 300 may receive a food order for a steak dinner, which is comprised of three components: a steak, French fries, and a house salad. Furthermore, the customer who made the food order has a preference for no added pepper to his or her food. Each of the three components is assigned appropriate group identifiers and all three are assigned to the group "no pepper", which indicates it cannot be grouped with components containing the ingredient "pepper". The components are optimally grouped into packaging groups and a packaging plan is created. Then containers are selected for each packaging group and this information is added to the packaging plan. The packaging plan containing the packaging groups and the selected containers sent to a restaurant computer or mobile device that may exist within a packaging staging station within a restaurant. A packaging tag is created using the information contained in the packaging plan and customer information. The packaging tag may be sent to the same packaging staging station where it may be printed and applied to the selected delivery and take-out containers. A restaurant employee working at the packaging staging station may use the packaging plan to retrieve the appropriate to-go containers and use the tags to ensure the food components are packaged such the food arrives at its destination in an optimal state for consumption.

In an embodiment, customers may provide feedback data to the system via customer portal 130, such feedback may include, but is not limited to the state the ordered food when it arrived at the destination, the accuracy and adequacy of the reheating plans, customer complaints, positive reviews, etc. This feedback data may be stored in a database 150. Food packaging optimization system 300 may use basic statistical analysis on the customer provided feedback data to adjust future optimal packaging group configurations, rules and relationships between group identifiers, and reheating instructions. In other embodiments, the feedback data may be fed into a training loop for a machine learned algorithm for optimally creating packaging groups.

Detailed Description of Exemplary Aspects

Figure 10:
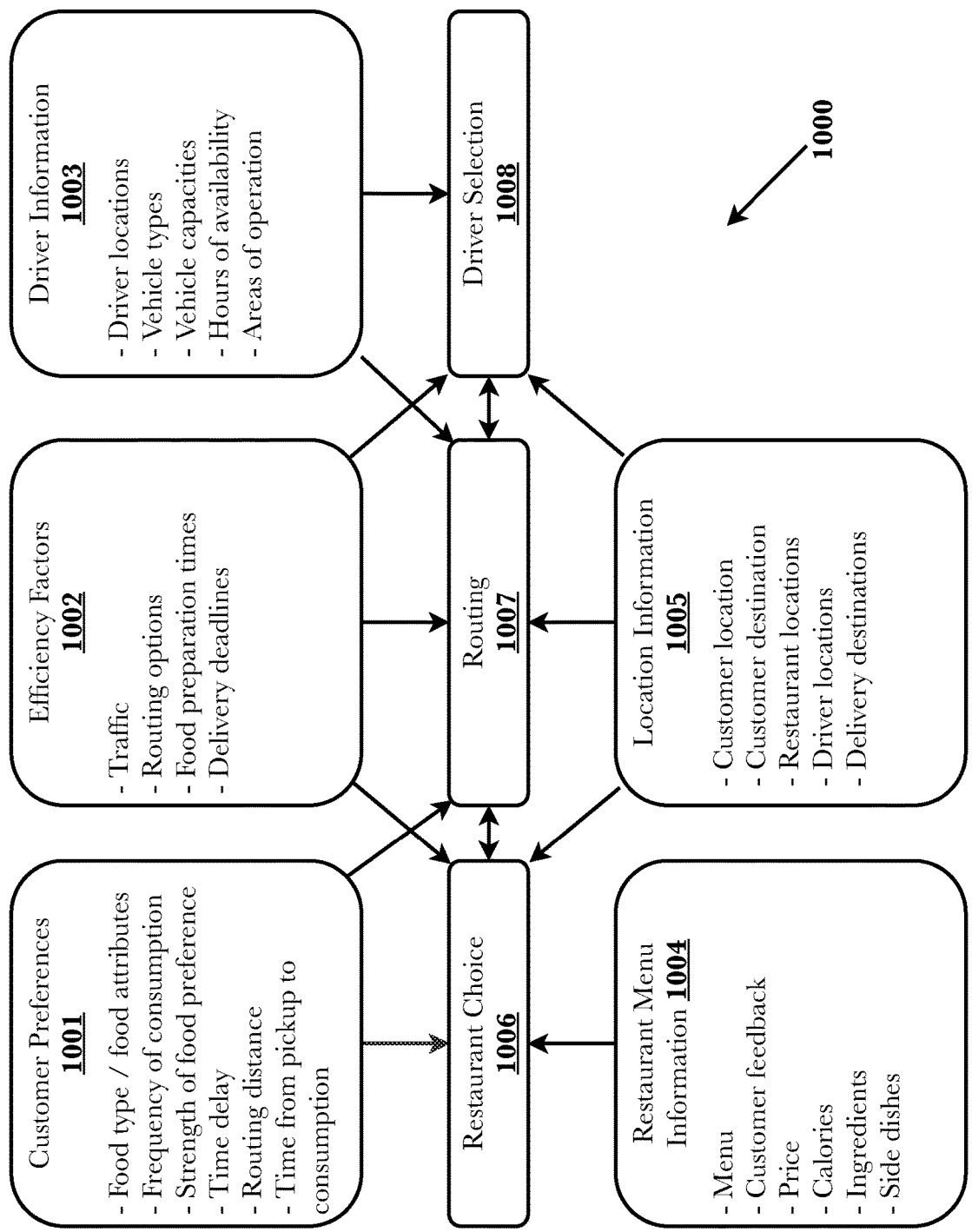
FIG. 10 is a diagram illustrating an exemplary optimization variables and the decisions they may impact.

FIG. 10 is a diagram illustrating an exemplary optimization variables and the decisions they may impact 1000. Customer preferences 1001 (e.g., food preferences and routing/delay preferences) will impact both restaurant choice and routing decisions. Efficiency factors 1002 (e.g., traffic, routing, food preparation times, and delivery deadlines) will impact all three decisions, restaurant choice 1006, routing 1007, and where applicable, driver selection 1008.

Delivery driver information 1003 (e.g., driver locations, vehicle types, vehicle capacities, hours of availability, area of operation) will impact routing decisions 1007 and driver selection 1008. Restaurant menu information 1004 (e.g., menu, customer feedback, price, calories, ingredients, side dishes) will impact primarily restaurant choice. Location information 1005 (e.g., location of customer, customer destination, locations of restaurants, locations of drivers, and delivery destinations) will impact all three decisions, restaurant choice 1006, routing 1007, and where applicable, driver selection 1008. Adding complexity to the analysis, restaurant choice 1006 can impact routing choices 1007, and vice-versa. Likewise, routing choices 1007 may impact driver selection 1008, and vice-versa.

Figure 11:
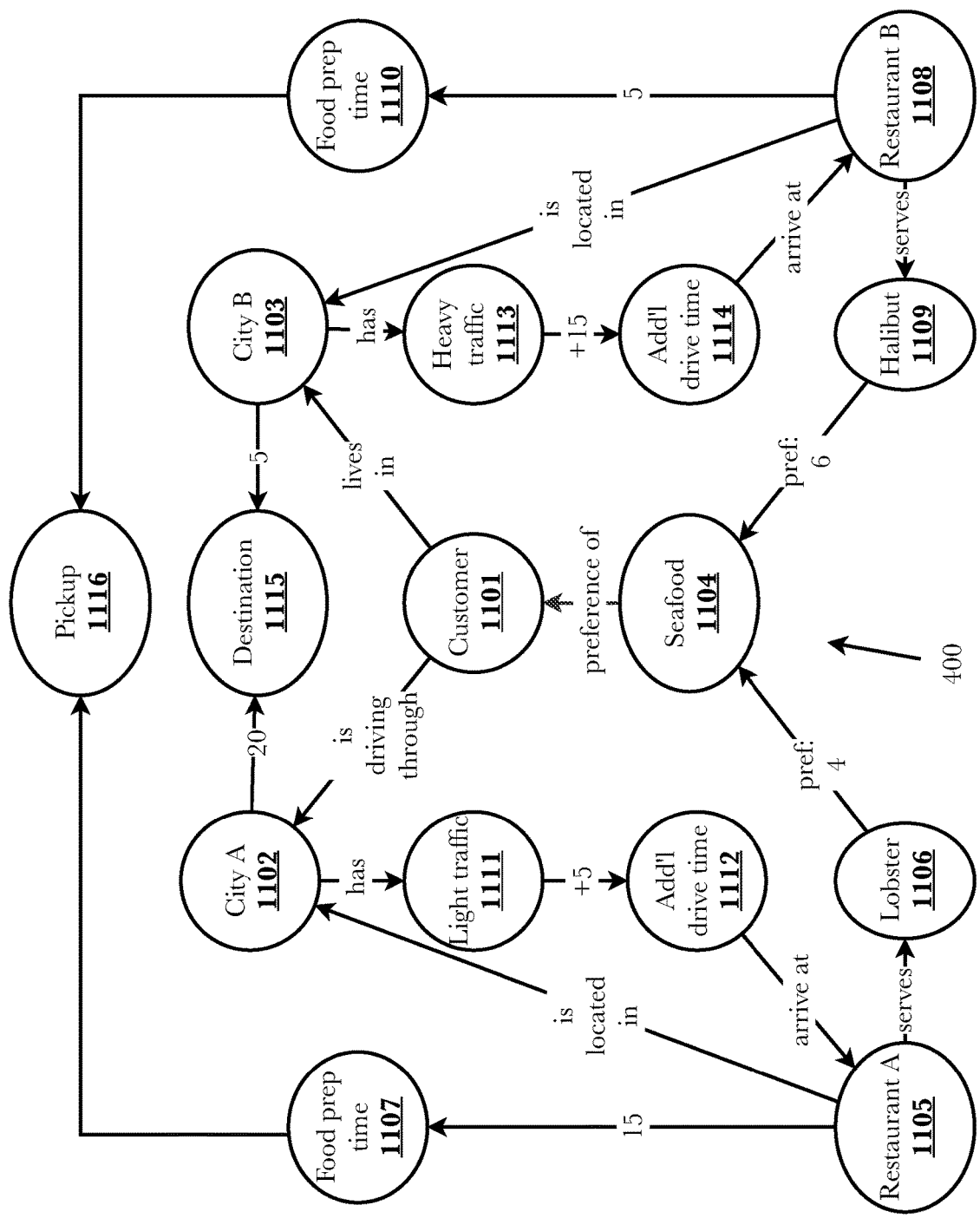
FIG. 11 is a diagram illustrating an exemplary weighted, directed graph of a type which may be used to optimize the multi-variate problem of optimizing en-route restaurant selection, ordering, and routing.

FIG. 11 is a diagram illustrating an exemplary weighted, directed graph 1100 of a type which may be used to optimize the multi-variate problem of optimizing en-route restaurant selection, ordering, and routing. One approach to solving multi-variate problems such as the coordination of customer preferences with locations and menu options is the use of data graphs to represent the totality of factors and their relationships, and apply one of a number of optimization algorithms to the graph to determine the shortest path or least-cost path. In a data graph, the nodes (also called vertices) of the graph represent data points, and the edges (lines between the nodes) represent relationships between the nodes. Data graphs may be directed or undirected, weighted or unweighted, and cyclical or acyclical. A directed graph contains edges that have a direction from one node to another, whereas undirected graphs contain edges that do not have a direction. A weighted graph has edges to which a value is assigned, whereas unweighted graphs do not have values assigned to their edges. Cyclical graphs contain at least one group of nodes through which a path may be repeated, whereas acyclical graphs do not contain any repeatable paths.

In this example, which is simplified for clarity, a weighted, directional graph is shown which contains relationships between the customer's location, the customer's preferences, the location of two restaurants, the type of food the restaurants serve, and the delays from order to pickup and from pickup to consumption. The customer 1101 lives in City B 1103, but is driving through City A 1102. City A has light traffic 1111, which would result in 5 minutes of additional drive time 1112, whereas City B has heavy traffic 1113, which would result in 15 minutes of additional drive time 1114. Restaurant A 1105 is located in City A 1102, which is nearer to the customer's current location 1101, whereas Restaurant B 1108 is located in City B 1103, which is further from the customer's 1101 current location, but closer to the customer's 1101 destination (assuming that the customer is driving home). Both restaurants serve a type of seafood 1104 which is a preference of the customer 1101, but Restaurant A 1105 serves lobster 1106, which is more preferred by the customer (preference value 4, with lower numbers being more preferred) than the halibut 1109 (preference value 6, with lower numbers being more preferred) offered by Restaurant B 1108.

The choice of restaurants may be determined by performing one or more weighted path calculations to determine the least cost path between certain nodes. For example, the least cost path between the restaurants and the customer 1101 is the path between Restaurant A and the customer (preference value 4), indicating that Restaurant A 1105 would be a preferred food choice. The least cost path between the customer and pickup 1116 through Restaurant A 1105 is through City A 1102 which has light traffic 1111, resulting in 5 additional minutes of drive time, but with a food prep time 1107 of 15 minutes (meaning that the customer will have to wait at the restaurant for 10 minutes after arriving), resulting in a total time from order to pickup 1116 of 15 minutes. The least cost path between the customer and pickup 1116 through Restaurant B 1105 is through City B 1103 which has heavy traffic 1113, resulting in 15 additional minutes of drive time, and with a food prep time 1110 of 15 minutes, also resulting in a total time from order to pickup 1116 of 15 minutes. So, the total time from order to pickup 1116 is the same for both restaurants, despite the additional time in heavy traffic for Restaurant B 1108. Lastly, the time from pickup 1116 to consumption is analyzed. The least cost path from City A 1102 to the destination 1115 is 20 minutes, while the least cost path from City B 1103 to the destination 1115 is 5 minutes. Thus, Restaurant A 1105 has a slightly preferred food, but will cause 15 minutes of delay to the travel time and the time from pickup to consumption is much longer. Restaurant B 1108 has an acceptable food, and will also cause 15 minutes of delay to the travel time, but the time from pickup 1116 to consumption is much shorter, so the food will be hot on arrival at the destination. Based on this analysis Restaurant B 1108 would likely be identified as preferable by the system, and would be presented to the customer over Restaurant A 1105. However, in a real-world scenario, there could be dozens of restaurants located in multiple cities along the customer's route, so this analysis would be greatly expanded. Certain choices would be eliminated entirely and other choices would be more obviously preferable.

Various methods for determining shortest path in a data graph are known in the art, including the Bellman—Ford Algorithm for determining the single shortest distance in O(# vertices times # of edges) time. For a graph with no negative weights, the single source shortest distance can be calculated using Dijkstra's algorithm in O(# of edges plus (#vertices times log (#vertices)) time using Dijkstra's algorithm. Other shortest path and least cost algorithms are known in the art and may be applied.

Alternatively, machine learning algorithms may be used to optimize the variables without creating a data graph in advance. Such algorithms may construct their own data graphs or other representations of the data, and continually optimize the outcomes either through multiple repetitions or through refinement of historical choices.

Figure 12:
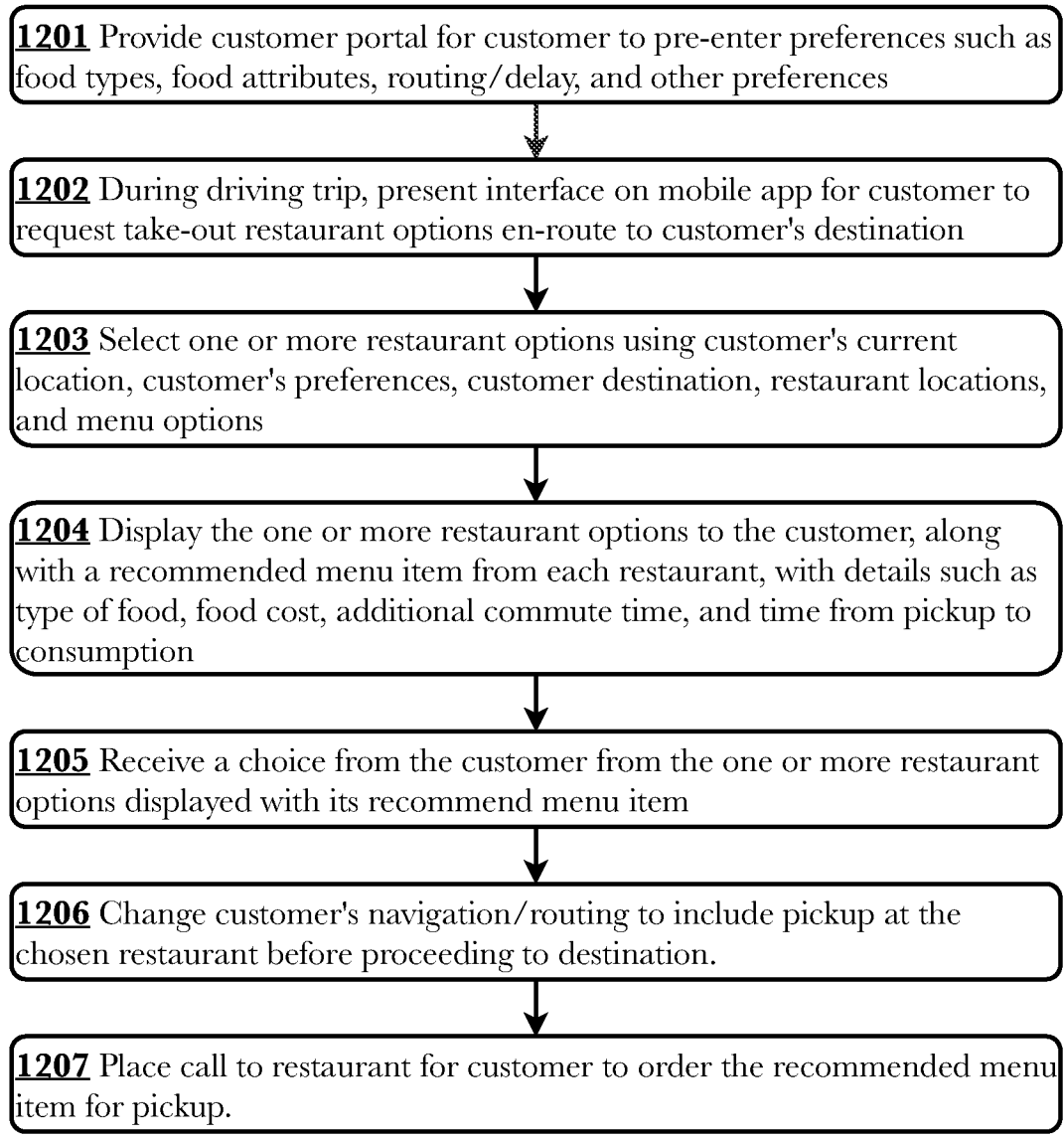
FIG. 12 is a flow diagram showing the steps of an exemplary method for en-route restaurant selection, food ordering, routing, and pickup by a customer.

FIG. 12 is a flow diagram showing the steps of an exemplary method for en-route restaurant selection, food ordering, routing, and pickup by a customer. A customer portal is provided for the customer to pre-enter preferences such as food types, food attributes, routing/delay, and other preferences 1201. During driving trip, the customer is presented with interface on mobile app for customer to request take-out restaurant options en-route to customer's destination 1202. One or more restaurant options are selected using customer's current location, customer's preferences, customer destination, restaurant locations, and menu options 1203. The restaurant options are displayed to the customer, along with a recommended menu item from each restaurant, with details such as type of food, food cost, additional commute time, and time from pickup to consumption 1204. A choice is received from the customer from the one or more restaurant options displayed with its recommend menu item 1205. The customer's navigation/routing is changed to include pickup at the chosen restaurant before proceeding to destination 1206. Finally, a call is placed to the restaurant for customer to order the recommended menu item for pickup 1207.

Figure 13:
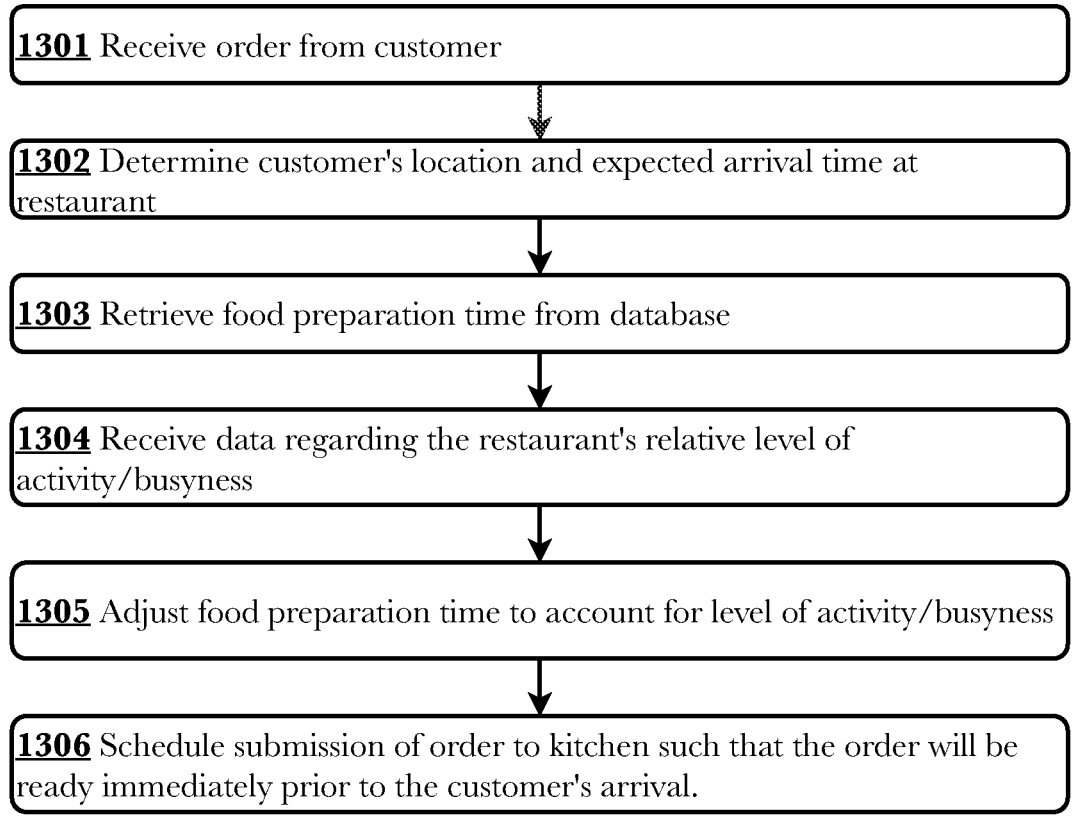
FIG. 13 is a flow diagram showing the steps of an exemplary method for restaurant food preparation optimization based on a customer's order, expected arrival time, and the restaurant's current activity level.

FIG. 13 is a flow diagram showing the steps of an exemplary method for restaurant food preparation optimization based on a customer's order, expected arrival time, and the restaurant's current activity level. The restaurant receives an order from a customer 1301. The customer's current location and expected time of arrival are determined 1302, which determination may take into account traffic and other factors. A food preparation time for the customer's order is retrieved from a database 1303. The restaurant's relative level of activity is determined (i.e., how busy is the restaurant?) 1304, and the food preparation time is adjusted to account for the level of activity 1305. Submission of the order to the kitchen is scheduled such that the order will be ready immediately prior to the customer's arrival 1306.

Figure 14:
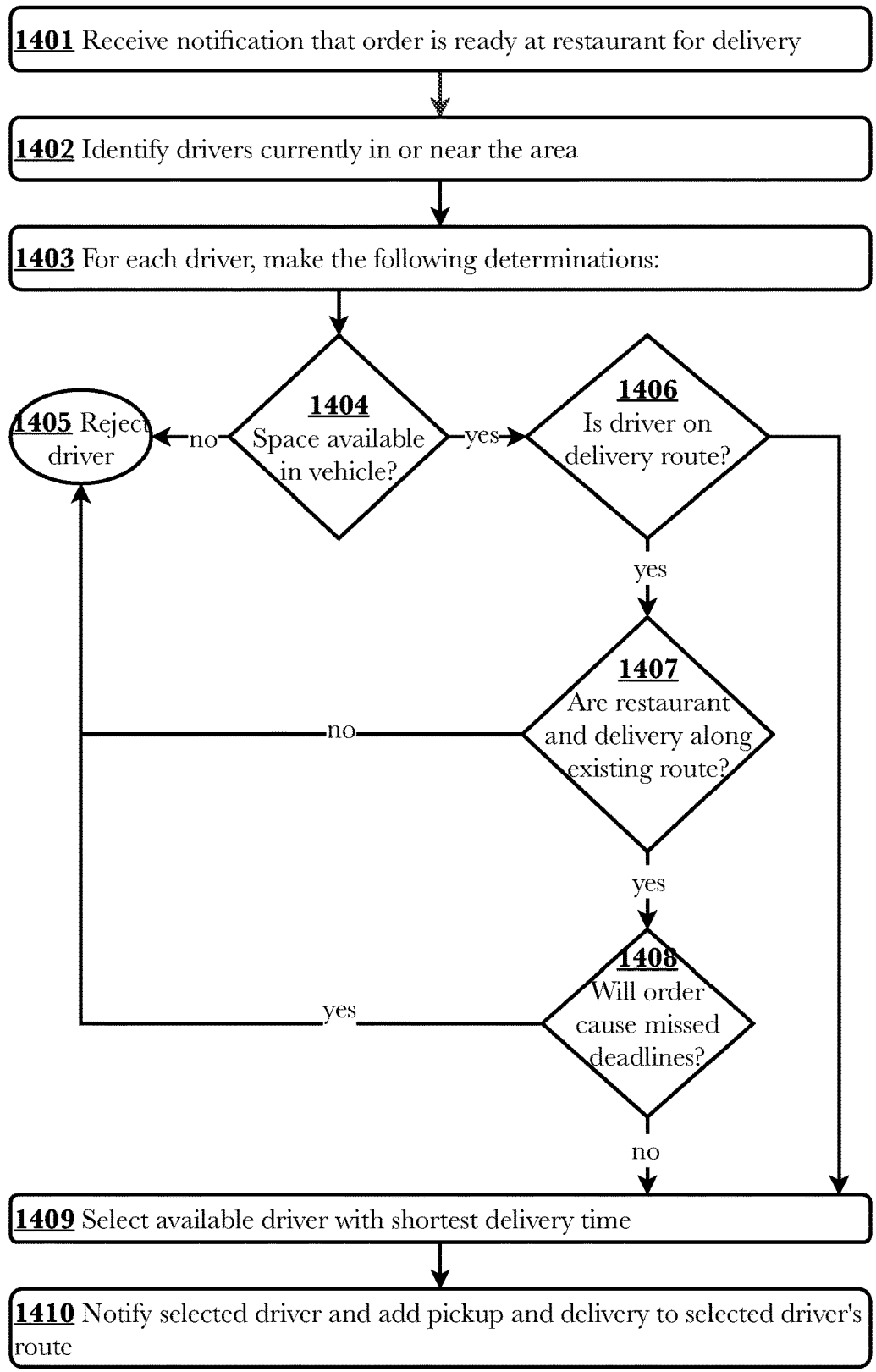
FIG. 14 is a flow diagram showing the steps of an exemplary method for optimization of delivery driver routing for multiple restaurants sharing multiple drivers.

FIG. 14 is a flow diagram showing the steps of an exemplary method for optimization of delivery driver routing for multiple restaurants sharing multiple drivers. Notification is received that an order is ready for pickup and delivery at a participating restaurant 1401. Drivers currently in or near the area are identified 1402. For each driver, a series of determinations is made 1403. First, the space available in the driver's vehicle is checked based on the number of orders the driver has picked up but not delivered and the capacity of the driver's vehicle 1404. If there is insufficient space, that driver is rejected 1405. Otherwise, a determination is made as to whether the driver is currently making a delivery 1406. If not, the driver is added to the list of potential drivers for step 1409. If the driver is currently making a delivery, a determination is made as to whether the restaurant and delivery are along (or near) the driver's current delivery route 1407. If not, the driver is rejected 1405. If they are, a final check is made to determine whether adding the pickup and delivery to the driver's current delivery route will cause the driver to miss any deadlines 1408. If yes, the driver is rejected 1405. Otherwise, the driver is added to the list of potential drivers for step 1409. At step 1409, a driver is selected from the list of potential drivers, the selection being based, in this example, on the shortest delivery time, although other options are possible. Finally, the selected driver is notified, and the pickup and delivery are added to the driver's route 1410. Note that the pickup and delivery do not have to be added to the end of the driver's route, and can be inserted between other deliveries, if that results in a more efficient overall route.

Figure 4:
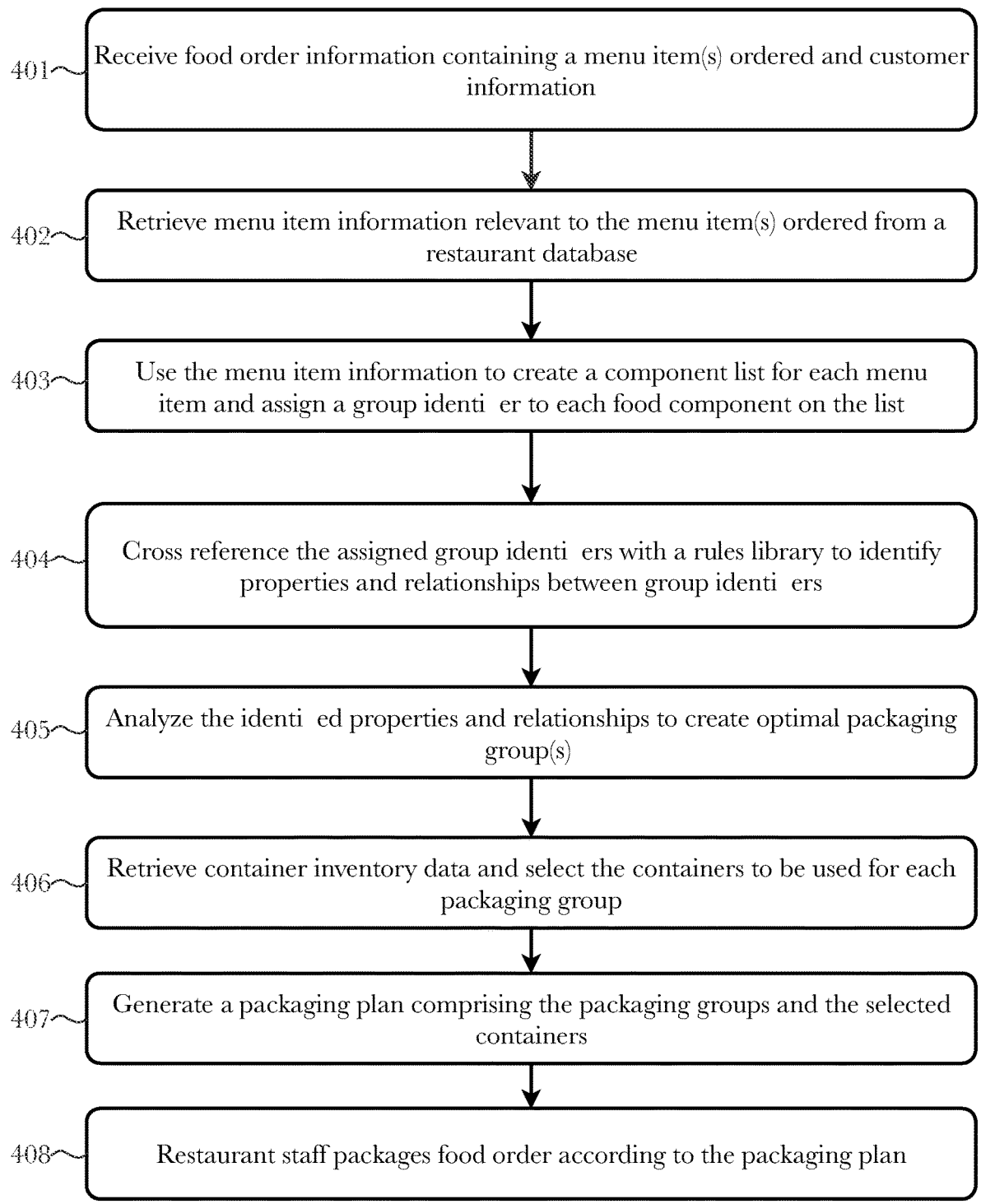
FIG. 4 is a diagram showing the steps of an exemplary method for optimally packaging food for delivery or take-out.

FIG. 4 is a diagram showing the steps of an exemplary method for optimally packaging food for delivery or takeout. The process begins when the food packaging optimization module 300 receives a food order containing one or more menu items and the customer information for the customer who placed the food order 401. Then menu item information for each menu item in the food order is retrieved from a restaurant database 402. The food components, stored in the menu item information, for each ordered menu item are compiled into a component list. Each item on the list is assigned one or more group identifiers which are used to categorize the food components 403. Next, the assigned group identifiers are cross referenced with a rules library to identify the properties and relationships between group identifiers 404. Each group identifier has pre-defined properties that help categorize the food component the group identifier has been assigned to. These pre-defined properties regulate the relationships that may or may not exist between food components. The properties and the relationships are analyzed to create optimal packaging groups for the received food order 405. After the packaging groups have been created, the next step is to retrieve to-go container inventory data and then select the containers most appropriate from the available stock to package each packaging group 406. The selected containers and the created packaging groups are combined to generate a packaging plan 407. The packaging plan may be sent to a restaurant computer or wireless mobile device where it may be used by other subsystems within the optimization engine 200 to coordinate preparation, packaging, and delivery actions. The restaurant may have a packaging staging station where a packaging plan may be received and the restaurant staff may package the food order according to the packaging plan 408. The packaged food order is then ready to be picked-up by the customer or delivery driver.

FIG. 5 is a diagram illustrating an exemplary packaging tag produced by a system for optimally packaging food for delivery and take-out 500, according to an embodiment. In this embodiment, the packaging tag is comprised of text fields 501-506 that may convey information about a customer and his or her food order. A packaging tag may contain customer information 501 such as a customer name, address and phone number, which can be used by the person picking up the food to verify that the order they receive is for the correct customer. If a food delivery driver picks-up the food order, they can verify the name and address on the packaging tag 500 with the name and address of the delivery destination. Packaging tag 500 may also include information such as the menu item 502 that the contents 503 of the container belong to as well as the number of servings 504 packaged within the container. Menu item 502 and contents 503 fields may also provide information about special requests, substitutions, and other customer food preferences if any exist. Additionally, there may be a field providing information about the container number 505 which may assist restaurant staff in ensuring that all food items of a food order are accounted for when packaging the prepared food. Another field that may be found on a packaging tag 500 provides reheating instructions 506 that may be used by a customer to reheat packaged food if the food arrived in a less than optimal state for consumption. For example, a customer places a food order for some clam chowder soup from a restaurant which is approximately a twenty minute drive from the customer's home, and the soup arrives lukewarm, but not hot. The customer may reheat the soup per instructions 506 on packaging tag 500 so that they may experience eating the soup in the same state if would arrive at the customer's table had they been enjoying a typical dine-in setting. Packaging tag 500 may also have a scannable identifier such as barcode or QR code 507 that may be scanned by restaurant staff when a packaging group is completely packaged with its correct contents. When QR code 507 is scanned, it sends a packaging confirmation signal to other subsystems located within optimization engine 200. For example, a packaging confirmation signal may be sent to delivery scheduler 232 to alert a delivery driver that the food is ready for pick-up. In another embodiment, the packaging tag may consist of a QR code only in which the text fields are encoded within the QR code.

Figure 6:
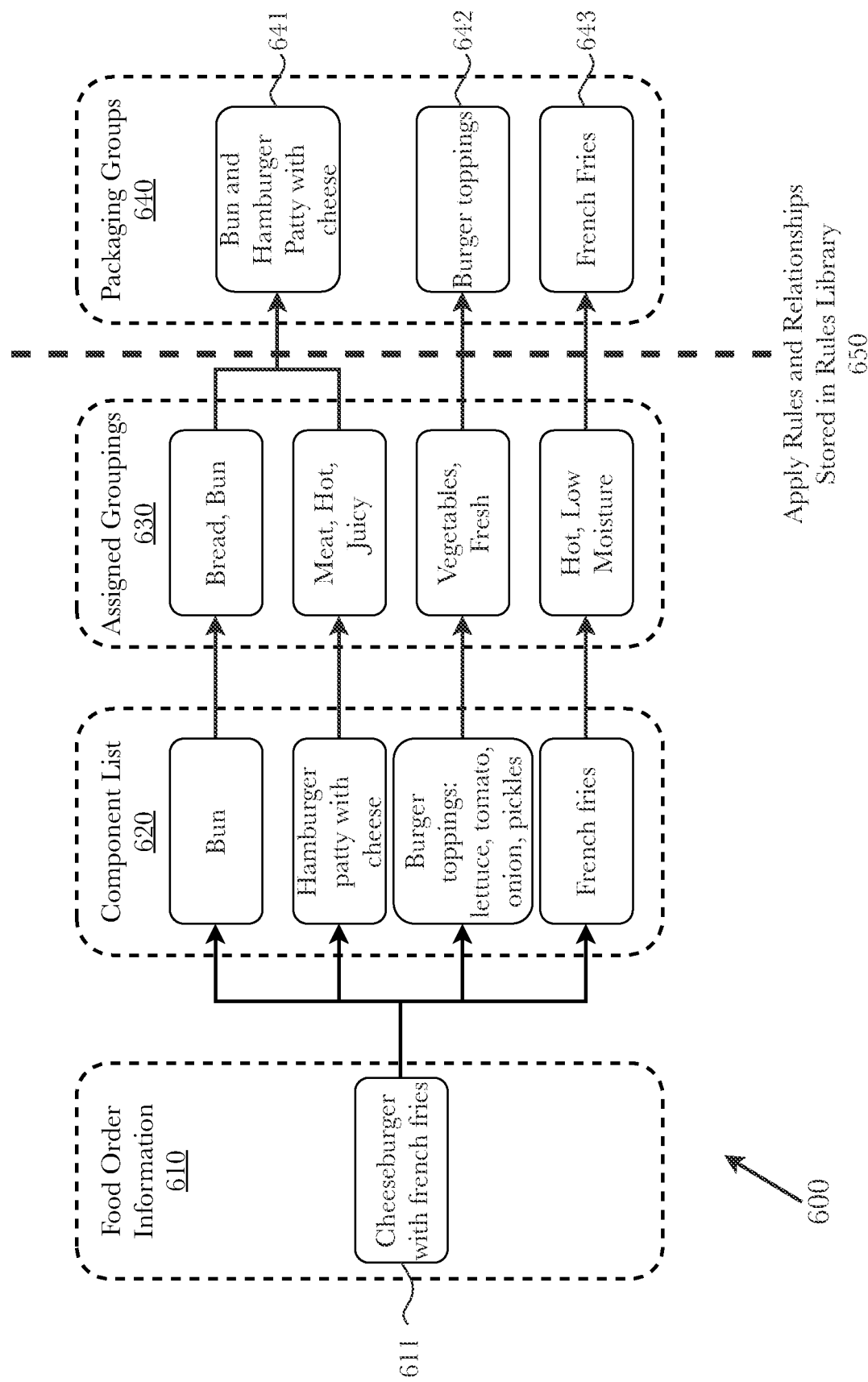
FIG. 6 is a diagram showing an exemplary process for determining optimal packaging groups, according to an embodiment.

FIG. 6 is a diagram showing an exemplary process for determining optimal packaging groups 600, according to an embodiment. The process begins when a food order information 610 is received by a system for optimally packaging food for delivery and take-out. In this example, the food order 610 comprises a single menu item 611, a cheeseburger with French fries. Menu item food component data is retrieved from a database 150 and a component list 620 is constructed. The food components of a cheeseburger with French fries are identified as a bun, a hamburger patty with cheese, the burger toppings, and French fries. The components on the list 620 may then be assigned one or more group identifiers 630 that are used to categorize the listed food components. There are numerous group identifiers that may be used by the system to categorize the food components, group identifiers 630 shown in this diagram are simple examples of possible group identifiers that may be assigned. The bun food component may be assigned the identifiers "bread" and "bun", the hamburger patty with cheese food component may be assigned the identifiers "meat", "hot", and "juicy", the burger toppings component may be assigned the identifiers "vegetables" and "fresh", and finally the French fries component may be assigned the identifiers "hot" and "low moisture". Each group identifier has a set of rules, contained within a rule library stored on a database 150, that define for each group identifier its properties and relationships between various group identifiers. For example, the "bread" identifier may have indicate that the food component is prone to absorbing moisture from steam, juices, sauces, etc., however, the "bun" indicates that the food component has properties that help keep meat warm and that absorbing juices is allowed or even preferable. In this way group identifiers can be used to narrow the scope or alter the properties and relationships of other assigned group identifiers. For instance, in this case the bun food component is assigned a "bread" identifier which is a broad category that may be assigned to sandwiches, breadsticks, etc., but the "bun" identifier may be used to provide more detailed categorization of the food component. As another example, the burger toppings assigned group identifiers are "vegetables" and "fresh" where the "fresh" identifier indicates the vegetables are not cooked. Fresh vegetables may have a property or rule that prevents them from being packaged with food components with a "hot" group identifier so that the vegetables arrive in a fresh, cool, and crisp state. Component list 620 and assigned group identifiers 630 are cross referenced with a rules library that utilizes predetermined rules and relationship data 650 to create optimal packaging groups 640 of food components such that the food arrives at its destination in an optimal state for consumption. In this example, the system created three separate packaging groups for the four food components on list 620.

The first created packaging group 641 is comprised of two food components, the bun and hamburger patty with cheese. According to the rules for each of the identifiers assigned to these two food components form a packaging group. The bun can be used to the keep the meat in an appropriate temperature range while also absorbing any meat juices that the hamburger patty may secrete during the time between when the food order leaves the restaurant and when it arrives at its destination. Second packaging group 642 contains only the burger toppings. This is because the other food components have "hot" identifiers, which, according to the rules associated with the "vegetables" and "fresh" identifiers, prevent packaging hot food with fresh food. Final packaging group 643 created contains only the French fries food component. The French fries and hamburger patty are not packaged together despite both having "hot" group identifiers. This is because the French fries food component also has a "low moisture" identifier which indicates the food needs to be transported in a low moisture container so that the fries do not arrive cold and soggy. As a result, the "low moisture" identifier may have a rule that states it cannot be packaged with another component that has a "juicy", "moist", "steamy", etc. identifier. The hamburger patty has a "juicy" identifier because it may leak meat juices, and as a result the system optimally creates separate packaging groups 643 and 641 for the French fries and hamburger patty.

Figure 7:
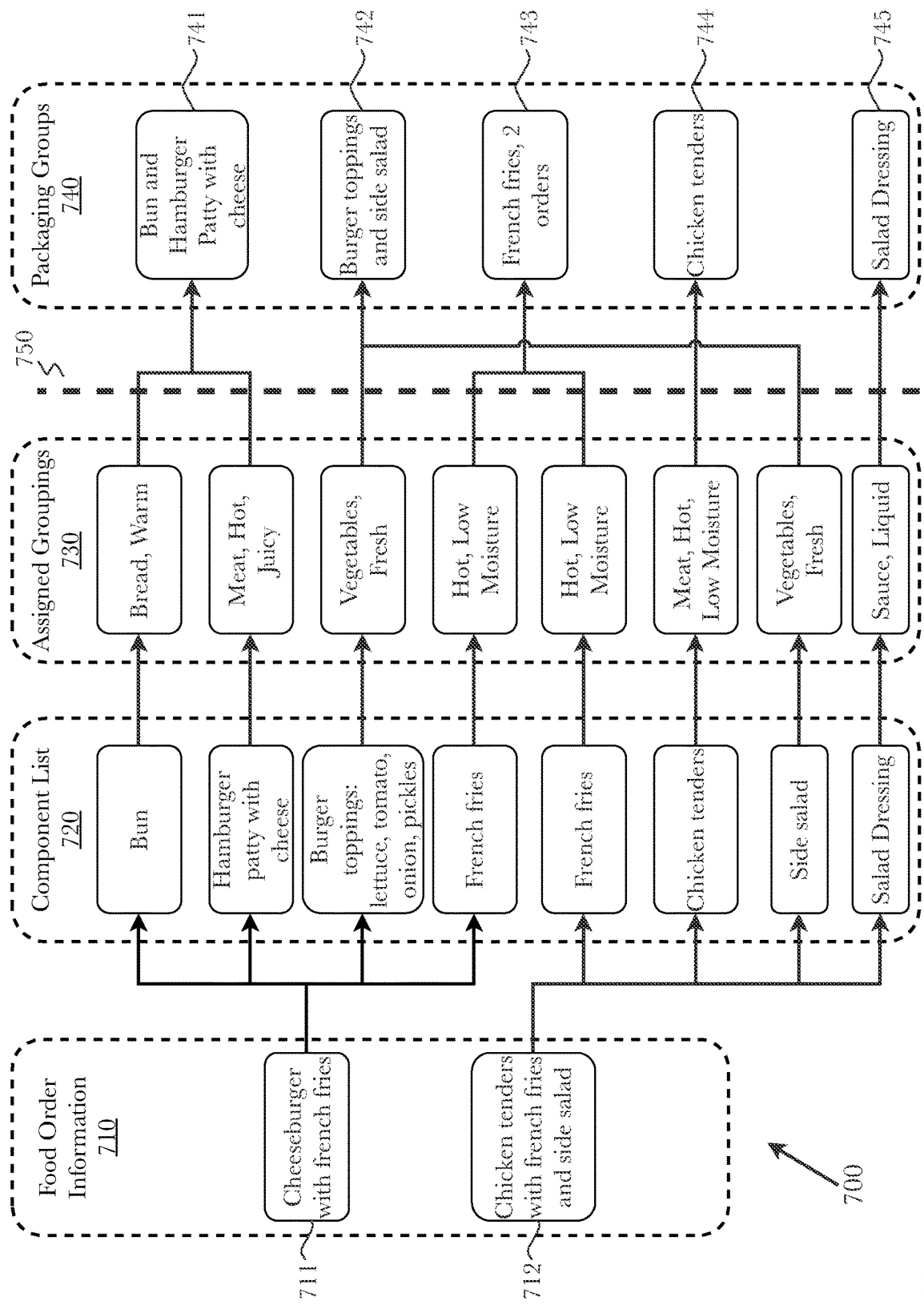
FIG. 7 is another diagram showing an exemplary process for determining optimal packaging groups, according to an embodiment.

FIG. 7 is another diagram showing an exemplary process for determining optimal packaging groups 700, according to an embodiment. The process 700 is the same as described in FIG. 6, however, in this example received food order information 710 contains multiple menu items 711, 712. Menu item food component data is retrieved from a database 150 and a component list 720 is constructed and each food component on the list is assigned a group identifier 730. Each group identifier has a set of rules, contained within a rule library stored on a database 150, that define for each group identifier its properties and relationships between various group identifiers. These rules are cross referenced 750 against the assigned group identifiers 730 to create optimal packaging groups 740 for all food components.

Two menu items 711, 712 are decomposed into a component list 720 comprising eight food components. The system creates five optimal packaging groups 740 for this food order. The first packaging group 741 contains the same contents as packaging group 641 according to the properties and rules as described in FIG. 6. The second packaging group 742 contains the burger toppings and side salad because both of those food components have the same group identifiers. Third packaging group 743 contains the French fries food components from both menu items included in food order information 710, because identical food components may be packaged and grouped together. However, if a customer made a special request, or if a customer has a food preference stored within a database 150 that, for instance, stated he or she wanted no salt on their French fries, then the French fries component associated with that request may further be assigned a group identifier such as "no salt" which has a rule that prohibits the French fries to be packaged with other French fries that do not have a "no salt" identifier. If this were the case, then optimal packaging group 743 may be split into two separate packaging groups to accommodate the special request or customer food preference. Fourth packaging group 744 contains only the chicken tenders. The "low moisture" may be assigned to the chicken tenders food component because the breading on the chicken tenders should remain hot, crispy, and crunchy so that they arrive in an optimal state for consumption. For this reason, the chicken tenders cannot be placed in the same packaging group as the hamburger patty with cheese because the "juicy" identifier has a rule that prevents it from being packaged with a food component that has a "low moisture" identifier. Packaging group 745 contains only the salad dressing food component. This simple example is used to illustrate the complex properties and relationships that may occur when a food order contains multiple menu items. This is essentially a multi-variate optimization process where the system uses a rules library to identify complex relationships between the variables (e.g., food components and their group identifiers) and then creates optimal packaging groups based upon the analysis of the identified relationships.

Figure 8:
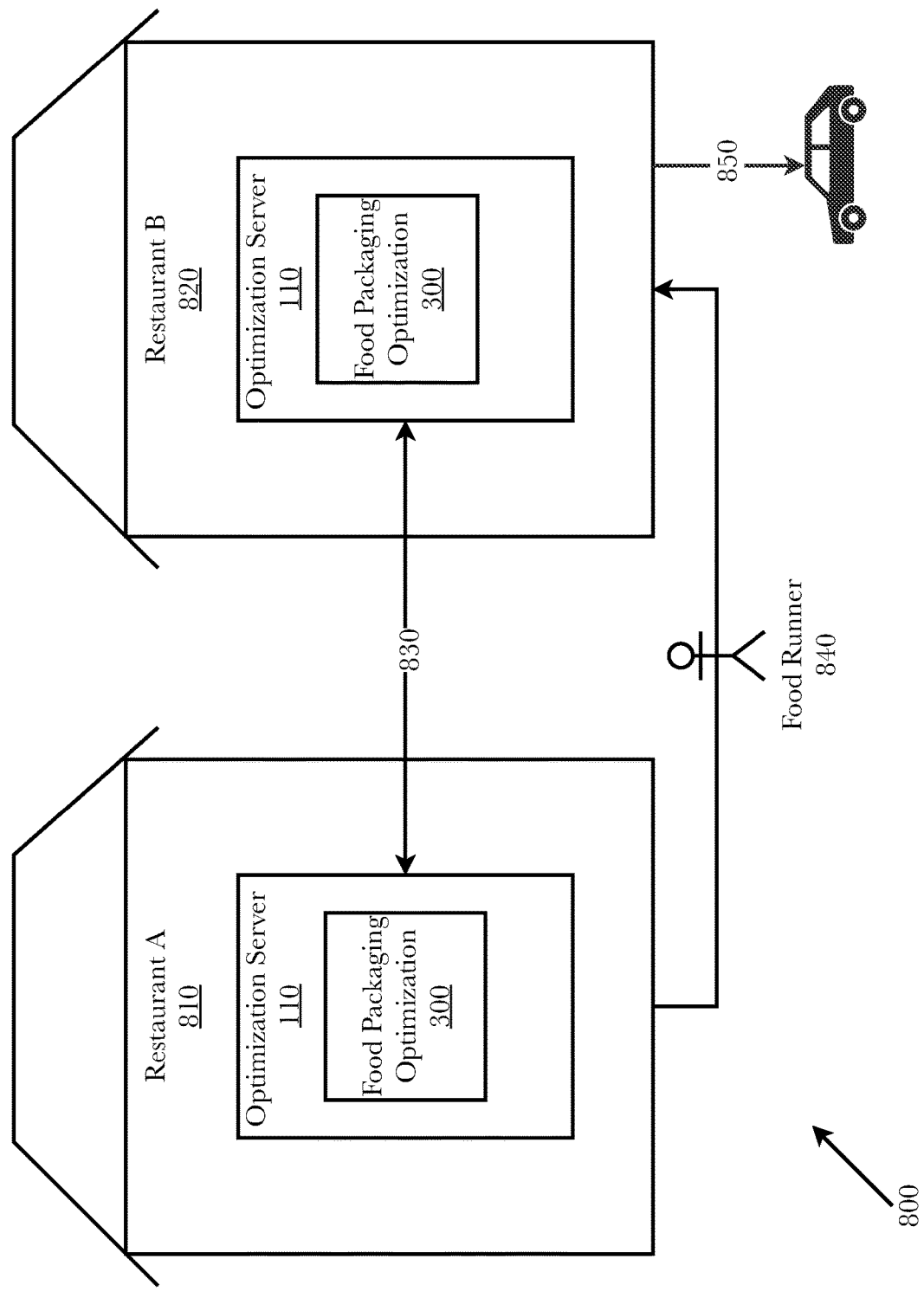
FIG. 8 is a diagram showing an exemplary coordination of packaging and delivery of a two food orders for one customer between two restaurants.

FIG. 8 is a diagram showing an exemplary coordination of packaging and delivery of a two food orders for one customer between two restaurants 800. Both restaurant A 810 and restaurant B 820 utilize the system for automated en-route business establishment selection, ordering, and routing 100 and both may access an optimization server 110 that facilitates communication 830 between the two restaurants 810, 820. Optimization server 110 contains food packaging optimization system module 300 which, when used in conjunction with system 100 allows customers, restaurant staff, and delivery drivers to coordinate ordering, preparing, packaging, and delivery of food such that it arrives at its final destination in an optimal state for consumption.

In a typical use case, a customer may be getting off work in the evening and wishes to pick up some food for him and his wife to eat when he gets home. The customer may want to eat Chinese food, but his wife wants Indian food for dinner. The customer may use a mobile device application to select the service that provides automated en-route business establishment selection, ordering, and routing to find a Chinese and Indian restaurant on his route home and also order the food he wants. Locations such as strip malls, plazas, town centers, retail centers, etc. commonly have multiple restaurants situated in these locations, and oftentimes they are located side by side or within a short walking distance. In this example, system 100 was able to locate and select a Chinese and Indian restaurant next door to each other and places the order for the husband as he drives to the location. Chinese restaurant 810 and Indian restaurant 820 both receive their respective food orders and begin to coordinate the preparation and packaging of food orders. Optimization server 110 allows both restaurants to communicate 830 with each other to coordinate the preparation and packaging such that both restaurants finish preparing and packaging the food orders just as the husband arrives at the location for pick up. Furthermore, a food runner 840 from the Chinese restaurant 810 may be able to run a completed, packaged order to the neighboring restaurant after payment has been confirmed via the customer mobile device application. The customer may receive alerts via the mobile device application that their food has been packaged and both the Chinese and Indian food orders are ready for pick up at Indian restaurant 820. This allows the customer to make one less stop on his way home. When the customer arrives at Indian restaurant 820 his mobile phone will alert the restaurant staff that he has arrived and a food runner may deliver 850 the food to the customer in his car in a completely contactless transaction.

Figure 9:
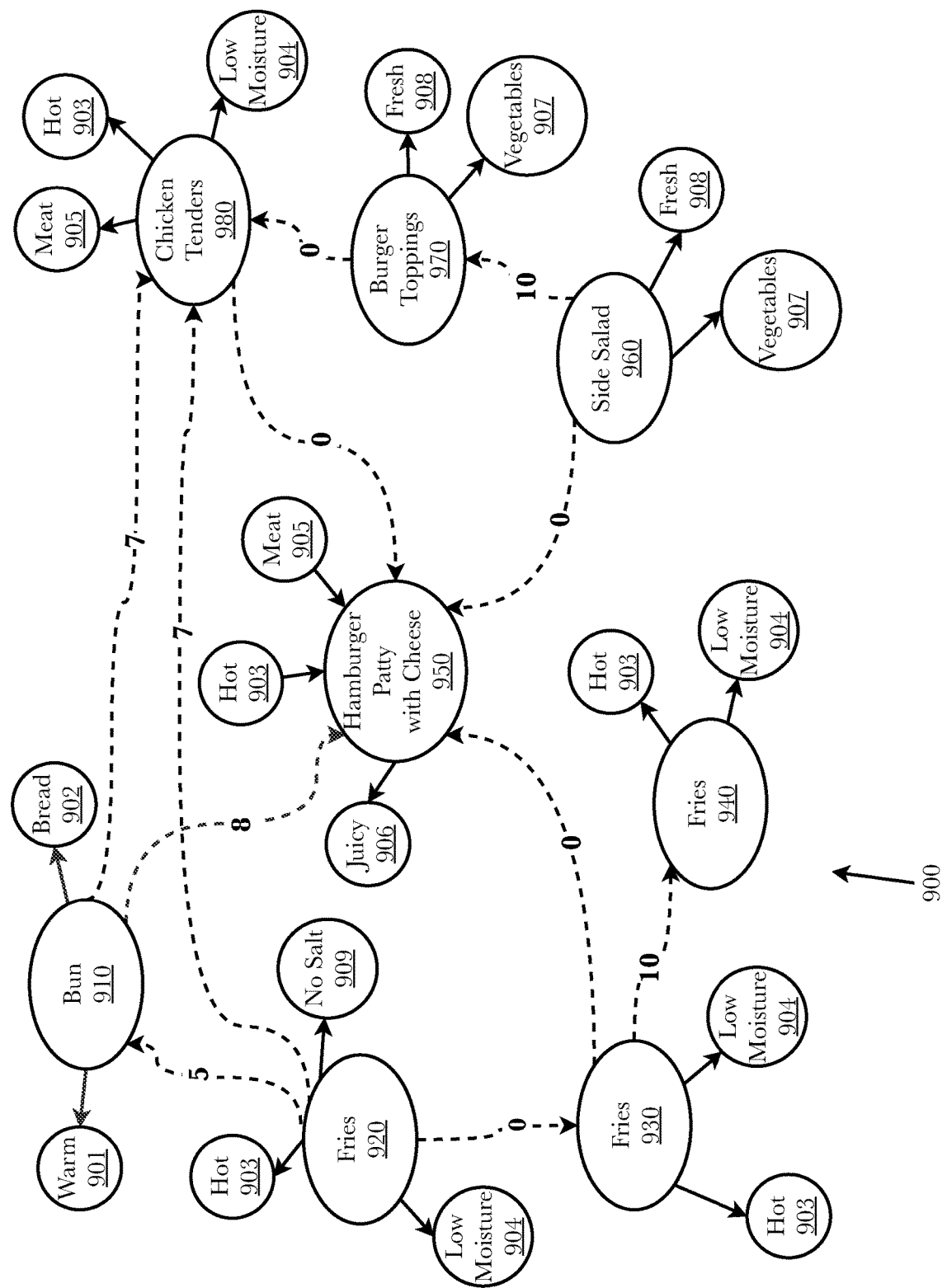
FIG. 9 is a diagram illustrating an exemplary weighted, directed graph of a type which may be used to optimize the multi-variate problem of optimizing packaging for food delivery or take-out.

FIG. 9 is a diagram illustrating an exemplary weighted, directed graph 900 of a type which may be used to optimize the multi-variate problem of optimizing packaging for food delivery or take-out. One approach to solving multi-variate problems such as the optimization of packaging groups is the use of data graphs to represent the entirety of factors and their relationships, and apply a number of optimization algorithms to determine the shortest path or least-cost path. In a data graph , the nodes (i.e. vertices) of the graph represent data points, and the edges represent relationships between the nodes. Data graphs may be directed or undirected, weighted or unweighted, and cyclical or acyclical.

In this example, which is simplified for clarity, a weighted, directed graph is shown which contains relationships between the food components, the group identifiers, and the group identifier properties. The food order menu item(s) contain the food components bun 910, three fry components 920, 930, 940, a hamburger patty with cheese 950, a side salad 960, burger toppings 970, and chicken tenders 980. Each food component is represented as a node, with the food component's assigned group identifiers being represented as smaller nodes surrounding the food component nodes. For instance, bun 910 food component has been assigned group identifiers "warm" 901 and "bread" 902. Each group identifier has an arrow, representing the edge relationship between food component and identifier, pointing from the food component to the identifier which indicates the food component has been assigned that group identifier. Each group identifier has a plurality of properties that describe the food component and may define relationship restrictions between group identifiers. The properties of each group identifier associated with the food component are used to create and infer relationships between food components. The relationships (edges) between food components may be weighted (dashed lines) indicating how acceptable it may be to group the connected food components together. For example, a weighted scale of zero to ten may be used to indicate acceptable groupings, where a weight of zero indicates the food components cannot be packaged together and a weight of ten indicates the food items should definitely be packaged together, forming a packaging group. Food components fries 930 and 940 both have the same group identifiers, "hot" 903 and "low moisture" 904 and as a result both contain the same properties. This indicates that these two food components should preferably be packaged together and as a result the edge between components 930 and 940 is given a weight of ten. Food component fries 920 also has the same identifiers as components 930 and 940, however, food component 920 also has been assigned the group identifier "no salt" 909 which has the property that the food component cannot contain any salt, nor be packaged with food components covered with salt. For this reason, the edge relationship between component 920 and component 930 is given a weight of zero indicating that the no salt fries should not be packaged with the salted fries.

Similarly, food components side salad 960 and burger toppings 970 both have been assigned the same group identifiers "vegetables" 907 and "fresh" 908 which results in a relationship with a weight of ten between those two food components. The bun component 910 has three identified edge relationships with three other food components, and each edge has a weight. In this case, the edge relationship with the highest score is selected to form a packaging group. A packaging group containing the bun 910 and the hamburger patty with cheese 950 may be selected because those two food components had the highest weight. The hamburger patty with cheese 950 and the chicken tenders 980 are not packaged together despite them sharing the same group identifiers "meat" 905 and "hot" 903. The "juicy" 906 identifier has a property that prevents component 950 from being packaged with a component that has the "low moisture" 904 identifier.

The choice of packaging groups may be determined by performing one or more weighted path calculations to determine the least cost path between certain nodes. Various methods for determining the shortest path in a data graph are known in the art, including the Bellman-Ford Algorithm for determining the single shortest distance in O(# vertices times # of edges) time. For a graph with no negative weights, the single source shortest distance can be calculated using Diijkstra's algorithm. Other shortest path and least cost algorithms are known in the art and may be applied.

Alternatively, machine learning algorithms may be used to optimize the variables without creating a data graph in advance. Such algorithms may construct their own data graphs or other representations of the data, and continually optimize the outcomes either through multiple repetitions or through refinement of historical choices.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 15:
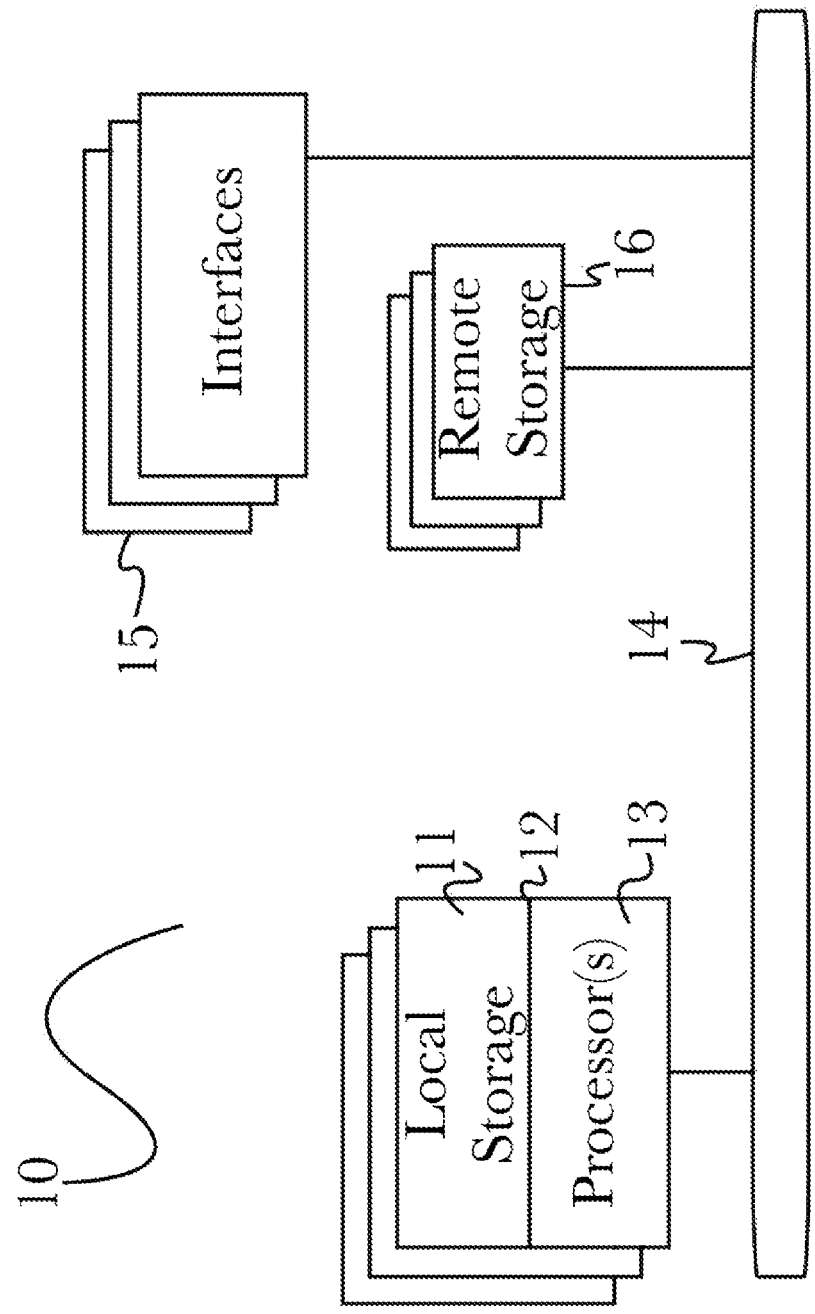
FIG. 15 is a block diagram illustrating an exemplary hardware architecture of a computing device.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
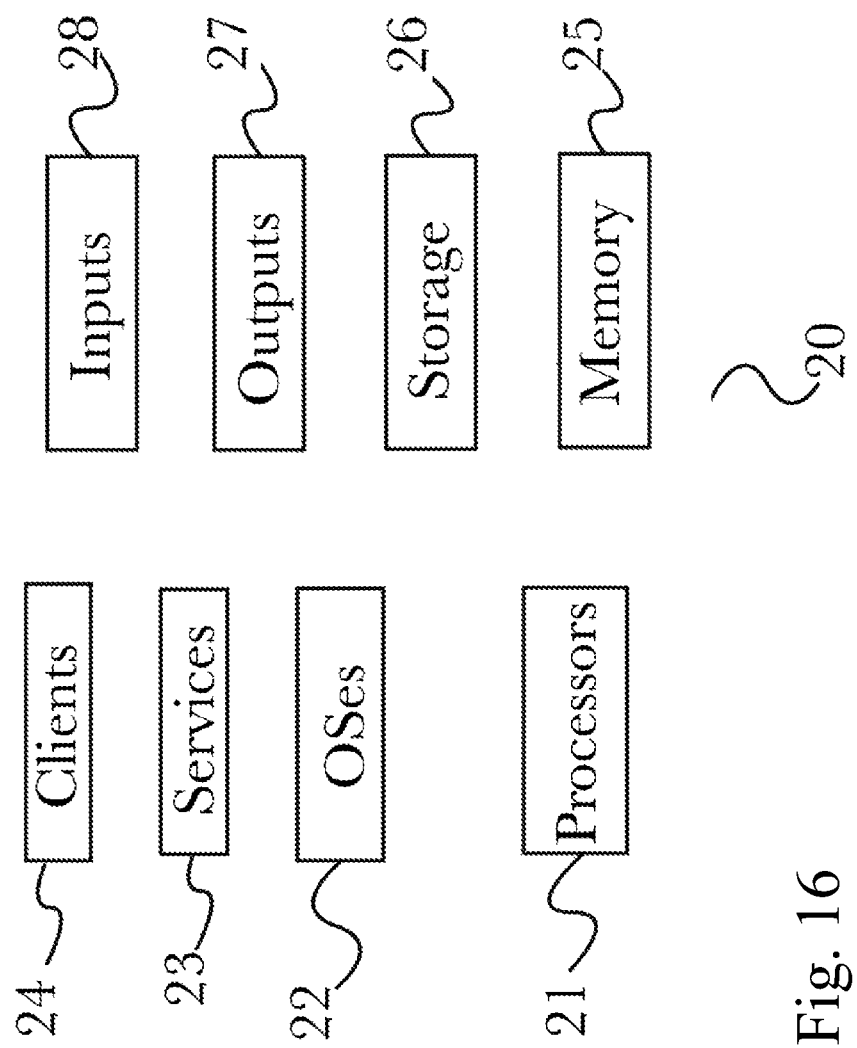
FIG. 16 is a block diagram illustrating an exemplary logical architecture for a client device.

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof Output devices 27 may be of any type suitable for providing output to one or more users, whether remote or local to system 20, and may include for example one or more screens for visual output, speakers, printers, or any combination thereof Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
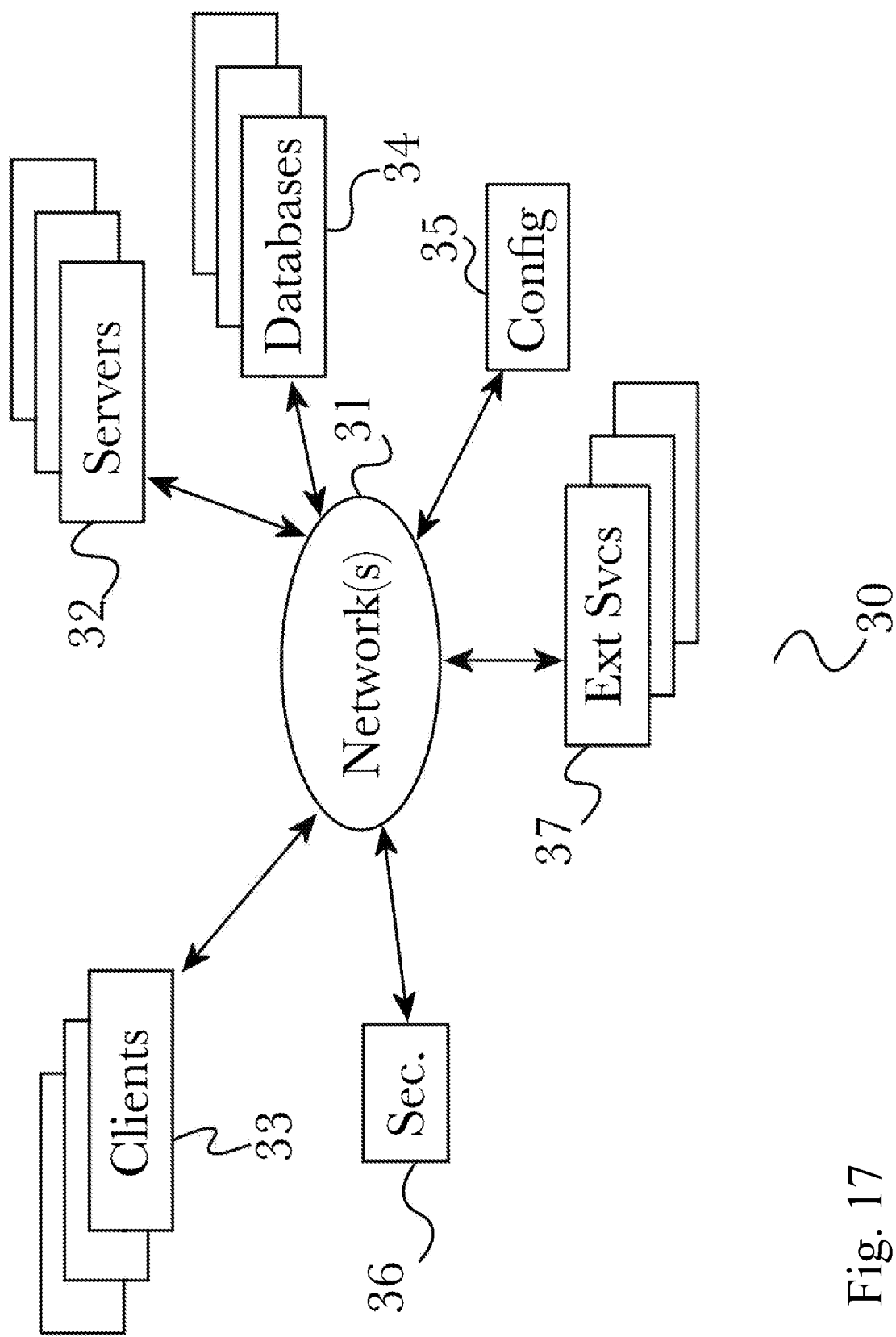
FIG. 17 is a block diagram showing an exemplary architectural arrangement of clients, servers, and external services.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 18:
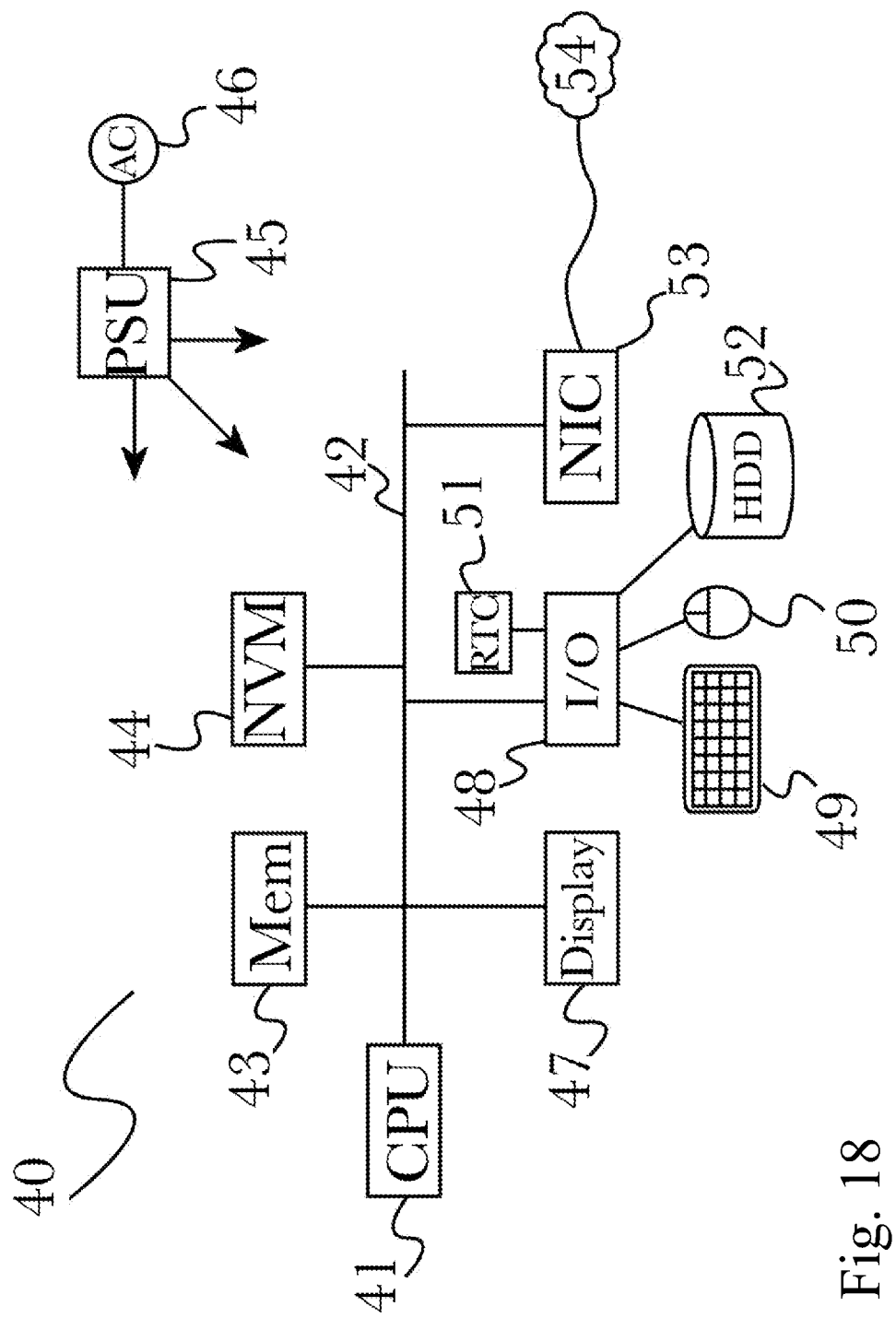
FIG. 18 is another block diagram illustrating an exemplary hardware architecture of a computing device.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for en-route business selection and ordering with optimized packaging for food delivery and takeout, comprising:
    a rules library database comprising a plurality of group identifiers, and for each group identifier one or more properties that define each specific group identifier;
    a container database comprising container inventory information, the container inventory information comprising a plurality of types of containers, and for each type of container a quantity and brief description of container features;
    a restaurant database comprising all available menu offerings, and for each menu offering a food that comprises the menu offering;
    a business selection engine comprising a first plurality of programming instructions stored in a memory of, and operable on a processor of, a network-connected computing device, wherein the first plurality of programming instructions, when operating on the processor, cause the computing device to:
        receive an order request from a user device via a network, the order request comprising a plurality of requested menu items desired by a user and a current destination of the user;
        receive a current location from the user device;
        search the restaurant database to identify suitable venues based on at least one of the requested menu items;
        select a plurality of the suitable venues based on at least the current location;
        determine a best-fit path between the current location and one of the selected venues, the best-fit path being based on the order request;
        send the best-fit path to the user device;
        send the order request to a food packaging optimization module;
    the food packaging optimization module comprising a second plurality of programming instructions stored in a memory of, and operable on a processor of, a computing device, wherein the second plurality of programming instructions, when operating on the processor, cause the computing device to:
        receive the order request;
        retrieve a plurality of food components from the business database, the food items being associated with each of the plurality of menu items in the order request;
        assign at least one group identifier for each food component;
        retrieve a plurality of properties for each assigned group identifier from the rules library database;
        create a data graph from the food components, the group identifiers, and the properties, the data graph comprising vertices and edges, wherein the vertices represent data points and the edges the relationships between data points;
        analyze the data graph to create packaging groups for each order comprising a plurality of foods and their specific group identifiers; and
        send a packaging plan comprising the packaging groups for each order to a packaging coordinator, the packaging groups being created such that the packaged foods for each order arrive in an optimal state for consumption;
    a packaging coordinator comprising a second plurality of programming instructions stored in a memory of, and operable on a processor of, a network connected computing device, wherein the second plurality of programming instructions, when operating on the processor, cause the computing device to:
        receive the packaging plan;
        receive food schedule information, the food schedule information comprising a food preparation start time and estimated time to completion;
        retrieve container inventory information from a container database;
        select a packaging container for each packaging group contained in the packaging plan by comparing the description of container features with the foods and their group identifiers;
        add the selected packaging containers to the packaging plan; and
        send the packaging plan and a packaging start time to a restaurant computing device, the packaging time being calculated such that the packaging is ready as each food is finished cooking.

2. The system of claim 1, wherein the best-fit path is further based on the current destination.

3. The system of claim 1, wherein the current destination is a placeholder destination that is replaced with one of the suitable venues.

4. The system of claim 1, further comprising a tag manager comprising a third plurality of programming instructions stored in a memory of, and operable on a processor of, a network connected computing device, wherein the third plurality of programming instructions, when operating on the processor, cause the computing device to:
    receive customer information comprising at least a name, address, and available customer preferences;
    receive the packaging plan;
    create a packaging tag using the customer information and the packaging plan, the packaging tag comprising a customer name and address, the type of container, and the food components to be placed in the container; and
    send the packaging tag to a restaurant computing device such that the packaging label may be printed and attached to the container specific to the packaging tag.

5. The system of claim 4, wherein the packaging tag is a scannable QR code.

6. A method for en-route business selection and ordering with optimized packaging for food delivery and takeout, comprising the steps of:
    receiving, at a business selection engine, an order request from a user device via a network, the order request comprising a plurality of requested menu items desired by a user and a current destination of the user;
    receiving a current location from the user device;

searching the restaurant database to identify suitable venues based on at least one of the requested menu items;

selecting a plurality of the suitable venues based on at least the current location;

determining a best-fit path between the current location and one of the selected venues, the best-fit path being based on the order request;

sending the best-fit path to the user device;

send the order request to a food packaging optimization module;

retrieving, at the food packaging optimization module, a plurality of food components from the business database, the food items being associated with each of the plurality of menu items in the order request;

assigning at least one group identifier for each food component;

retrieving a plurality of properties for each assigned group identifier from the rules library database;

creating a data graph from the food components, the group identifiers, and the properties, the data graph comprising vertices and edges, wherein the vertices represent data points and the edges the relationships between data points;

analyzing the data graph to create packaging groups for each order comprising a plurality of foods and their specific group identifiers; and sending a packaging plan comprising the packaging groups for each order to a restaurant computing device, the packaging groups being created such that the packaged foods for each order arrive in an optimal state for consumption;

receiving, at the packaging coordinator, food schedule information, the food schedule information comprising a food preparation start time and estimated time to completion;

retrieving container inventory information from a container database;

selecting a packaging container for each packaging group contained in the packaging plan by comparing the description of container features with the foods and their group identifiers;

adding the selected packaging containers to the packaging plan; and sending the packaging plan and a packaging start time to a restaurant computing device, the packaging time being calculated such that the packaging is ready as each food is finished cooking.

7. The method of claim 6, wherein the best-fit path is further based on the current destination.

8. The method of claim 6, wherein the current destination is a placeholder destination that is replaced with one of the suitable venues.

9. The method of claim 6, further comprising the steps of:
receiving customer information comprising at least a name, address, and available customer preferences;
receiving the packaging plan;
creating a packaging tag using the customer information and the packaging plan, the packaging tag comprising a customer name and address, the type of container, and the food components to be placed in the container; and
sending the packaging tag to a restaurant computing device such that the packaging label may be printed and attached to the container specific to the packaging tag.

10. The method of claim 9, wherein the packaging tag is scannable QR code.

* * * * *